(12) United States Patent
Asada et al.

(10) Patent No.: US 8,033,732 B2
(45) Date of Patent: Oct. 11, 2011

(54) HYDRODYNAMIC BEARING DEVICE, AND SPINDLE MOTOR EQUIPPED WITH SAME

(75) Inventors: Takafumi Asada, Osaka (JP); Hiroaki Saito, Ehime (JP); Daisuke Ito, Osaka (JP); Shigeo Obata, Hyogo (JP)

(73) Assignee: Panasonic Corporation, Osaka (JP)

( * ) Notice: Subject to any disclaimer, the term of this patent is extended or adjusted under 35 U.S.C. 154(b) by 651 days.

(21) Appl. No.: 12/179,067

(22) Filed: Jul. 24, 2008

(65) Prior Publication Data
US 2009/0028474 A1 Jan. 29, 2009

(30) Foreign Application Priority Data
Jul. 27, 2007 (JP) ................................. 2007-196679

(51) Int. Cl.
*F16C 32/06* (2006.01)

(52) U.S. Cl. ....................................... 384/100; 384/107

(58) Field of Classification Search .................. 384/100, 384/107, 114, 119
See application file for complete search history.

(56) References Cited

U.S. PATENT DOCUMENTS

| 6,836,388 | B2 | 12/2004 | Nishimura et al. | |
| 2007/0140605 | A1* | 6/2007 | Asada et al. | 384/107 |
| 2007/0183698 | A1* | 8/2007 | Hada | 384/107 |
| 2007/0201779 | A1* | 8/2007 | Kim | 384/107 |
| 2007/0230840 | A1* | 10/2007 | Asada et al. | 384/107 |
| 2007/0253650 | A1* | 11/2007 | Asada et al. | 384/100 |

FOREIGN PATENT DOCUMENTS

| JP | 2002-54628 | 2/2002 |
| JP | 2003-158861 | 5/2003 |

* cited by examiner

*Primary Examiner* — Thomas R Hannon
(74) *Attorney, Agent, or Firm* — Wenderoth, Lind & Ponack, L.L.P.

(57) ABSTRACT

In a hydrodynamic bearing device with which the lubricant is prevented from leaking to the outside, and good seal performance can be maintained, and in a spindle motor equipped with this hydrodynamic bearing device, the hydrodynamic bearing device includes a shaft, a sleeve, a lubricant that fills a microscopic gap, a radial bearing portion, a thrust bearing portion, and a bearing seal portion. The value of a function P1/V1, where V1 is a fluctuation volume of the sleeve in the axial direction and P1 is a capillary pressure index at a vapor-liquid interface located near the opened end of the bearing seal portion, is at least a specific value.

12 Claims, 21 Drawing Sheets

HYDRODYNAMIC BEARING DEVICE, AND SPINDLE MOTOR EQUIPPED WITH SAME

TECHNICAL FIELD

The present invention relates to a hydrodynamic bearing device installed in a recording or reproducing apparatus, such as a hard disk drive (hereinafter referred to as a HDD), and to a spindle motor equipped with this hydrodynamic bearing device.

BACKGROUND ART

Recording apparatuses and so forth that make use of a rotating disk have grown in memory capacity in recent years, and their data transfer rates have also risen. Therefore, the bearing devices used in these recording apparatuses need to offer high reliability and performance for rotating a disk load at a high degree of accuracy. Hydrodynamic bearing devices, which are well suited to high-accuracy rotation, have been used in these recording apparatuses. Small notebook personal computers and other such mobile devices also require recording apparatuses that have higher capacity, are smaller in size, and are more resistant to impact.

With a hydrodynamic bearing device, oil or another such lubricant is interposed between a shaft and a sleeve member, pumping pressure is generated by hydrodynamic grooves during rotation, and this pressure rotates the shaft in non-contact fashion with respect to the sleeve. Because there is no contact between the shaft and the sleeve, there is no mechanical friction, which makes hydrodynamic bearing devices suited to fast and accurate rotation.

SUMMARY OF INVENTION

Problem to be Solved by the Invention

The hydrodynamic bearing devices used in mobile products need to be impact resistant, and must not allow air to get into the bearing gap and cause lubricant film breakdown, or allow lubricant leakage. Impact resistance of about 700 G was required in the past, but today such products must be able to withstand impact as high as 2000 G.

With the hydrodynamic bearing devices disclosed in Patent Documents 1 (Japanese Laid-Open Patent Application 2002-54628) and Patent Documents 2 (Japanese Laid-Open Patent Application 2003-158861), a flange that is integrally attached to the shaft has a gap (looseness) in the axial direction between the sleeve and a thrust plate. When the hydrodynamic bearing device is subjected to an impact load in the axial direction, the shaft repeatedly moves in the axial direction, as if the piston of a water pistol were going in and out. The lubricant that fills the bearing gap leaks to the opening at this point, bubbles flow into, and before long the lubricant film breaks down.

The present invention was conceived to solve these problems encountered in the past, and it is an object thereof to provide a hydrodynamic bearing device with which the lubricant is prevented from leaking to the outside, and good seal performance can be maintained, and a spindle motor equipped with this hydrodynamic bearing device.

Means for Solving Problem

The hydrodynamic bearing device according to the first invention comprises a shaft, a sleeve member, a lubricant, a bearing portion, and a bearing seal portion. The sleeve member has a bearing hole including an open end and a closed end, and is disposed in a state in which the shaft is inserted in the bearing hole with a microscopic gap in between, and in which the sleeve member is capable of rotation relative to the shaft. The lubricant fills the microscopic gap. The bearing portion has a radial bearing portion supporting the shaft and the sleeve member in the radial direction of the shaft via the lubricant, and a thrust bearing portion supporting the shaft and the sleeve member in the axial direction. The bearing seal portion is disposed on an opened end side of the bearing portion, and suppresses leakage of the lubricant from the opened end by capillary force working between the shaft and the sleeve member. The value of a function P1/V1, where V1 implies a fluctuation volume and P1 is a first capillary pressure index, is at least a specific value. V1 and P1 are given below.

$$V1 = \pi \times dg \times dg \times G \tag{1}$$

V1: volume (m³) by which the sleeve member is able to move in the axial direction relative to the shaft dg: outermost radius (m) of the bearing portion at the open end G: distance (m) by which the sleeve member is able to move in the axial direction relative to the shaft $$Fg1o = \pi \times D1 \times \gamma \times \cos\theta \tag{2}$$

$$Fg1i = \pi \times D1i \times \gamma \times \cos\theta \tag{3}$$

$$D1i = D1 - 2 \times r1 \tag{4}$$

$$Fg1 = Fg1o + Fg1i \tag{5}$$

$$Ag1 = \pi \times (D1^2 - D1i^2)/4 \tag{6}$$

$$P1 = Fg1/Ag1 \tag{7}$$

P1: capillary pressure index (Pa) at the vapor-liquid interface located near the opened end of the bearing seal portion γ: surface tension (N/m) of the lubricant θ: contact angle (radians) of the lubricant D1: outside diameter (m) of the vapor-liquid interface located near the opened end of the bearing seal portion r1: lubricant film thickness (m) at the vapor-liquid interface located near the opened end of the bearing seal portion Here, if we look at the relation between V1, which implies the fluctuation volume, and P1, which is the first capillary pressure index, the value of the function P1/V1 is set to be at least a specific value.

The "shaft" referred to here also includes a rotor hub, etc., attached to the shaft.

P1 and V1 will each be described below.

The fluctuation volume V1 refers to the volume by which the sleeve member is able to move in the axial direction relative to the shaft, and is expressed by the following relational formula (1).

$$V1 = \pi \times dg \times dg \times G \tag{1}$$

Here, when the bearing seal portion is formed by the outer peripheral surface of the sleeve member and the inner peripheral surface of the rotor hub attached to the shaft, and the thrust bearing portion is disposed near the open end of the sleeve member, for example, then dg, which is the outermost radius of the bearing portion at the open end, refers to the radius of the outermost portion of the thrust bearing portion in the radial direction of the shaft. When the bearing seal portion is formed by the outer peripheral surface of the shaft and the inner peripheral surface of the sleeve member, and the bearing seal portion is disposed near the open end of the sleeve member, for example, then dg refers to the radius of the radial bearing portion.

The first capillary pressure index PI refers to the capillary pressure index at the vapor-liquid interface located near the opened end of the bearing seal portion, and is expressed by a relational formula (7) derived from the following relational formulas (2) to (6).

$$Fg1o = \pi \times D1 \times \gamma \times \cos\theta \quad (2)$$

$$Fg1i = \pi \times D1i \times \gamma \times \cos\theta \quad (3)$$

$$D1i = D1 - 2 \times r1 \quad (4)$$

$$Fg1 = Fg1o + Fg1i \quad (5)$$

$$Ag1 = \pi \times (D1^2 - D1i^2)/4 \quad (6)$$

$$P1 = Fg1/Ag1 \quad (7)$$

Here, r1 is the lubricant film thickness at the vapor-liquid interface located near the opened end. In general, the peripheral faces of the shaft and the sleeve member that form the bearing seal portion (hereinafter referred to as the bearing seal faces) are tilted in the direction in which the gap widens toward the opened end side. There is also a case in which the vapor-liquid interface located near the opened end is formed at an angle, rather than being substantially perpendicular to the axial direction. Therefore, when the inner and outer bearing seal faces form an angle α to each other, there will be a case in which a line that bisects the inner and outer bearing seal faces is angled (2/α), in which case if relational formula (2) is strictly expressed, it is given as the following relational formula (2A).

$$Fg1o = \pi \times D1 \times \gamma \times \cos\theta \times \cos(\alpha/2) \quad (2A)$$

The angle α of the above-mentioned bearing seal faces is only about 20 degrees at most, and therefore the inclination of the vapor-liquid interface is only about 10 degrees. Since $\cos(\alpha/2) \approx 0.985$, ignoring the angle α of the bearing seal faces in calculations will have no effect on the relational formula (2).

Furthermore, the bearing seal portion is constituted such that V2, which is the volume of the lubricant reservoir in the bearing seal portion, and V1, which implies the fluctuation volume, satisfy V1<V2.

With a conventional hydrodynamic bearing device, a flange that is integrally attached to the shaft has a gap (looseness) in the axial direction between the sleeve member and a thrust plate, and when the hydrodynamic bearing device is subjected to an impact load in the axial direction, the shaft repeatedly moves in the axial direction, as if the piston of a water pistol were going in and out. The lubricant that fills the bearing gap leaks out of the opening at this point, bubbles flow into, and before long the lubricant film breaks down. This has been dealt with by keeping the gap in the axial direction within a specific range, and thereby ensuring good impact resistance, but with hydrodynamic bearing devices used in mobile products that may be subjected to higher impact loads, for example, adequate seal performance cannot be maintained.

In view of this, with the hydrodynamic bearing device of the present invention, attention is focused on the relation (P1/V1) between the first capillary pressure index P1, which is believed to be correlated with the seal performance of the bearing seal portion, and the fluctuation volume V1, which is believed to be correlated with impact resistance, and the function P1/V1 is set to be at least a specific value. The critical point at which the lubricant will not leak out from the opened end of the bearing seal portion is then calculated for each assumed impact load and bearing shape, and applied as the above-mentioned specific value.

This means that if the value of the function P1/V1 corresponding to a specific impact load and bearing shape is satisfied, then even if the bearing is subjected to an impact from the outside, it will be possible to prevent the lubricant from leaking out from the opened end.

As a result, it is possible to prevent the lubricant from leaking to the outside, and to maintain good seal performance.

The hydrodynamic bearing device according to the second invention is the hydrodynamic bearing device according to the first invention, wherein a rotor hub member formed from a substantially circular top plate and a cylindrical wall hanging down from the top plate is attached on the open end side of the shaft, the bearing seal portion is formed by the outer peripheral surface of the sleeve member and the inner peripheral surface of the rotor hub member, and the value of the function P1/V1 is at least $4.5 \times 10^{11}$.

Here, the value of the function P1/V1 between V1, which implies the fluctuation volume, and P1, which is the capillary pressure index at the vapor-liquid interface located near the opened end of the bearing seal portion formed by the cylindrical wall of the rotor hub member and the outer peripheral surface of the sleeve member, is set to be at least $4.5 \times 10^{11}$.

This value of $4.5 \times 10^{11}$ is calculated as the critical point at which the lubricant will not leak out from the opened end of the bearing seal portion at an assumed impact load of 2000 G in the above-mentioned hydrodynamic bearing device in which a rotor hub member formed by a substantially circular top plate and a cylindrical wall hanging down from the top plate is attached on the open end side of the shaft, and the bearing seal portion is formed by the outer peripheral surface of the sleeve member and the inner peripheral surface of the rotor hub member.

This makes it possible to prevent the lubricant from leaking to the outside, and to maintain good seal performance. The hydrodynamic bearing device according to the third invention is the hydrodynamic bearing device according to the first invention, wherein the bearing seal portion is formed by the outer peripheral surface of the shaft and the inner peripheral surface of the sleeve member, and the value of the function P1/V1 is at least $1.5 \times 10^{12}$.

Here, the value of the function P1/V1 between V1, which implies the fluctuation volume, and P1, which is the capillary pressure index at the vapor-liquid interface located near the opened end of the bearing seal portion formed by the outer peripheral surface of the shaft and the inner peripheral surface of the sleeve member, is set to be at least $1.5 \times 10^{12}$.

This value of $1.5 \times 10^{12}$ is calculated as the critical point at which the lubricant will not leak out from the opened end of the bearing seal portion at an assumed impact load of 2000 G in the above-mentioned hydrodynamic bearing device in which the bearing seal portion is formed by the outer peripheral surface of the shaft and the inner peripheral surface of the sleeve member.

This makes it possible to prevent the lubricant from leaking to the outside, and to maintain good seal performance.

The hydrodynamic bearing device according to the fourth invention is the hydrodynamic bearing device according to the first invention, wherein the value of a function P2/V1, where V1 implies a fluctuation volume and P2 implies a second capillary pressure index, is at least a specific value. V1 and P2 are given as follows.

$$V1 = \pi \times dg \times dg \times G \quad (8)$$

V1: volume (m³) by which the sleeve member is able to move in the axial direction relative to the shaft dg: outermost radius (m) of the bearing portion at the open end G: distance (m) by which the sleeve member is able to move in the axial direction relative to the shaft $$Fg2o = \pi \times D2 \times \gamma \times \cos\theta \tag{9}$$

$$Fg2i = \pi \times D2i \times \gamma \times \cos\theta \tag{10}$$

$$D2i = D2 - 2 \times r2 \tag{11}$$

$$Fg2 = Fg2o + Fg2i \tag{12}$$

$$Ag2 = \pi \times (D2^2 - D2i^2)/4 \tag{13}$$

$$P2 = Fg2/Ag2 \tag{14}$$

P2: capillary pressure index (Pa) at the vapor-liquid interface located near the interior part of the bearing seal portion γ: surface tension (N/m) of the lubricant θ: contact angle (radians) of the lubricant D2: outside diameter (m) of the interior part of the bearing seal portion r2: lubricant film thickness (m) at the vapor-liquid interface located near the interior part of the bearing seal portion Here, attention is focused on the relation (P2/V1) between the second capillary pressure index P2, which is believed to be correlated with the seal performance of the bearing seal portion, and the fluctuation volume V1, which is believed to be correlated with impact resistance, and the function P2/V1 is set to be at least a specific value. The critical point at which the lubricant will not leak out from the opened end of the bearing seal portion is then calculated for each assumed impact load and bearing shape, and applied as the above-mentioned specific value.

P2 and V1 are each discussed below.

The fluctuation volume V1 refers to the volume by which the sleeve member is able to move in the axial direction relative to the shaft, and is expressed by the following relational formula (8).

$$V1 = \pi \times dg \times dg \times G \tag{8}$$

The second capillary pressure index P2 refers to the capillary pressure index at the interior part of the bearing seal portion, that is, at the vapor-liquid interface located near the interior part of the bearing seal portion, and is expressed by a relational formula (14) derived from the following relational formulas (9) to (13).

$$Fg2o = \pi \times D2 \times \gamma \times \cos\theta \tag{9}$$

$$Fg2i = \pi \times D2i \times \gamma \times \cos\theta \tag{10}$$

$$D2i = D2 - \times r2 \tag{11}$$

$$Fg2 = Fg2o + Fg2i \tag{12}$$

$$Ag2 = \pi \times (D2^2 - D2i^2)/4 \tag{13}$$

$$P2 = Fg2/Ag2 \tag{14}$$

The phrase "the interior part of the bearing seal portion" used here refers to the portion on the interior side from the opened end of the bearing seal portion toward the bearing portion. For instance, if the bearing seal portion has a shape that tapers in the direction in which the gap widens toward the opened end, then the smallest portion of the gap is referred to as the interior part of the bearing seal portion.

Here, r2 is the lubricant film thickness at the vapor-liquid interface located near the interior part of the bearing seal portion. In general, the peripheral faces of the shaft and the sleeve member that form the bearing seal portion (hereinafter referred to as the bearing seal faces) are tilted in the direction in which the gap widens toward the opened end side. There is also a case in which the vapor-liquid interface located near the interior part of the bearing seal portion is formed at an angle, rather than being substantially perpendicular to the axial direction. Therefore, when the inner and outer bearing seal faces form an angle α to each other, there will be a case in which a line that bisects the inner and outer bearing seal faces is angled, in which case if relational formula (14) is strictly expressed, it is given as the following relational formula (14A).

$$Fg2o = \pi \times D2 \times \gamma \times \cos\theta \times \cos(\alpha/2) \tag{14A}$$

The angle α of the above-mentioned bearing seal faces is only about 20 degrees at most, and therefore the inclination of the vapor-liquid interface is only about 10 degrees. Since $\cos(\alpha/2) \approx 0.985$, ignoring the angle α of the bearing seal faces in calculations will have no effect on the relational formula (14).

This means that the lubricant can be prevented more reliably from leaking out of the opened end by satisfying the value of the function P2/V1 corresponding to a specific impact load and bearing shape.

As a result, even if the vapor-liquid interface should fluctuate, it is possible to prevent the lubricant from leaking to the outside, and to maintain good seal performance.

The hydrodynamic bearing device according to the fifth invention is the hydrodynamic bearing according to the first invention, wherein the value of a function (P1/V1)×D1×D1×L, where V1 implies the fluctuation volume, P1 implies the first capillary pressure index, D1 is the outside diameter of the vapor-liquid interface located near the opened end of the bearing seal portion, and L is the bearing length, which is the length in the axial direction of the portion filled with the lubricant, satisfies the following relation formula (15):

$$(P1/V1) \times D1 \times D1 \times L \geq 45{,}000 \tag{15}$$

Here, it is surmised that any bubbles that work their way into the radial bearing portion will be more likely to be discharged outside of the radial bearing portion if the outside diameter D1 of the vapor-liquid interface is larger and the opening surface area is greater, and that even if bubbles should be trapped inside the bearing, the longer is the bearing portion, the less the bubbles will diminish performance, so with the hydrodynamic bearing device of the present invention, the value of the function (P1/V1)×D1×D1×L is set to be at least a specific value.

Here, the function (P1/V1)×D1×D1×L includes D1×D1, which is the correlation with the opening surface area at the opened end of the bearing seal portion, and L, which is the length of the radial bearing portion. If the specific value is set to at least 45,000, the loss of performance caused by bubbles in the radial bearing portion can be suppressed.

As a result, it is possible to prevent a decrease in seal performance due to bubbles in the radial bearing portion.

The hydrodynamic bearing device according to the sixth invention is the hydrodynamic bearing device according to the first invention, wherein the value of a function (P1/V1)×D1×D1×r3×L, where V1 implies the fluctuation volume, P1 is the first capillary pressure index, D1 is the outside diameter of the vapor-liquid interface located near the opened end of the bearing seal portion, L is the bearing length, which is the length in the axial direction of the portion filled with the lubricant, and r3 is the gap of the radial bearing portion in the radial direction of the shaft, satisfies the following relation formula (16):

$$(P1/V1) \times D1 \times D1 \times r3 \times L \geq 0.1 \quad (16)$$

Here, it is surmised that any bubbles that work their way into the radial bearing portion will be more likely to be discharged outside of the radial bearing portion if the opening surface area is greater, and that even if bubbles should be trapped inside the bearing, the greater is the volume of the bearing portion, the less the bubbles will diminish performance, so with the hydrodynamic bearing device of the present invention, the value of the function $(P1/V1) \times D1 \times D1 \times r3 \times L$ is set to be at least a specific value.

Here, the function $(P1/V1) \times D1 \times D1 \times r3 \times L$ includes $D1 \times D1$, which is the correlation with the opening surface area at the opened end of the bearing seal portion, and $r3 \times L$, which is the correlation with the volume of the radial bearing portion. If the specific value is set to at least 0.1, the loss of performance caused by bubbles in the radial bearing portion can be suppressed.

As a result, it is possible to prevent a decrease in seal performance due to bubbles in the radial bearing portion.

The hydrodynamic bearing device according to the seventh invention is the hydrodynamic bearing device according to the first invention, wherein the value of a function P2/Kr, where P2 is a second capillary pressure index and Kr is a channel resistance coefficient, is at least a specific value. P2 and Kr are given as follows.

$$Fg2o = \pi \times D2 \times \gamma \times \cos\theta \quad (29)$$

$$Fg2i = \pi \times D2i \times \gamma \times \cos\theta \quad (30)$$

$$D2i = D2 - 2 \times r2 \quad (31)$$

$$Fg2 = Fg2o + Fg2i \quad (32)$$

$$Ag2 = \pi \times (D2^2 - D2i^2)/4 \quad (33)$$

$$P2 = Fg2/Ag2 \quad (34)$$

P2: capillary pressure index (Pa) at the vapor-liquid interface located near the interior part of the bearing seal portion
γ: surface tension (N/m) of the lubricant
θ: contact angle (radians) of the lubricant
D2: outside diameter (m) of the interior part of the bearing seal portion
r2: lubricant film thickness (m) at the vapor-liquid interface located near the interior part of the bearing seal portion $$Kr = 12 \times \mu \times Lr \times (T \times r3 \times r3 \times r3) \quad (35)$$

Kr: channel resistance coefficient
r3: gap (m) of the radial bearing portion in the radial direction of the shaft
Lr: radial bearing portion length (m)

$$T = \pi \times D3 \quad (36)$$

T: channel width (m)
D3: outside diameter (m) of the shaft

Here, attention is focused on the fact that Kr, which is the channel resistance at the radial bearing portion, should be made sufficiently small with respect to P2, which is the capillary pressure index at the interior part of the bearing seal portion, in order to return the lubricant to the bearing gap at the instant the impact load is released, and with the hydrodynamic bearing device of the present invention the value of the function P2/Kr is set to be at least a specific value. The critical point at which the lubricant will not leak out from the opened end of the bearing seal portion is then calculated for the assumed impact load and bearing shape, and applied as the above-mentioned specific value.

Leakage of the lubricant is more pronounced if the impact load is applied repeatedly, and the reason for this is believed to be that the lubricant that has been moved by the impact load to the lubricant reservoir in the bearing seal portion is subjected to the next impact load before it is returned to the gap of the radial bearing portion by surface tension.

P2 and Kr are each discussed below.

The second capillary pressure index P2 refers to the capillary pressure index at the interior part of the bearing seal portion, that is, at the vapor-liquid interface located near the interior part of the bearing seal portion, and is expressed by a relational formula (34) derived from the following relational formulas (29) to (33).

$$Fg2o = \pi \times D2 \times \gamma \times \cos\theta \quad (29)$$

$$Fg2i = \pi \times D2i \times \gamma \times \cos\theta \quad (30)$$

$$D2i = D2 - 2 \times r2 \quad (31)$$

$$Fg2 = Fg2o + Fg2i \quad (32)$$

$$Ag2 = \pi \times (D2^2 - D2i^2)/4 \quad (33)$$

$$P2 = Fg2/Ag2 \quad (34)$$

The phrase "the interior part of the bearing seal portion" used here refers to the portion on the interior side from the opened end of the bearing seal portion toward the bearing portion. For instance, if the bearing seal portion has a shape that tapers in the direction in which the gap widens toward the opened end, then the smallest portion of the gap is referred to as the interior part of the bearing seal portion.

Here, r2 is the lubricant film thickness at the vapor-liquid interface located near the interior part of the bearing seal portion. In general, the peripheral faces of the shaft and the sleeve member that form the bearing seal portion (hereinafter referred to as the bearing seal faces) are tilted in the direction in which the gap widens toward the opened end side. There is also a case in which the vapor-liquid interface located near the interior part of the bearing seal portion is formed at an angle, rather than being substantially perpendicular to the axial direction. Therefore, when the inner and outer bearing seal faces form an angle α to each other, there will be a case in which a line that bisects the inner and outer bearing seal faces is angled, in which case if relational formula (29) is strictly expressed, it is given as the following relational formula (29A).

$$Fg2o = \pi \times D2 \times \gamma \times \cos\theta \times \cos(\alpha/2) \quad (29A)$$

The angle α of the above-mentioned bearing seal faces is only about 20 degrees at most, and therefore the inclination of the vapor-liquid interface is only about 10 degrees. Since $\cos(\alpha/2) \approx 0.985$, ignoring the angle α of the bearing seal faces in calculations will have no effect on the relational formula (29).

The channel resistance coefficient Kr refers to the channel resistance coefficient at the radial bearing portion, and is expressed by the following relational formula (35).

$$Kr = 12 \times \mu \times Lr \times (T \times r3 \times r3 \times r3) \quad (35)$$

Here, Lr is the length of the radial bearing portion in the axial direction. For example, when the radial bearing portion is formed at two places (two steps) in the axial direction, this refers to the sum of the lengths of both bearing portions.

The channel width T is calculated from the following relational formula (36), and D3 is the outside diameter of the shaft.

$$T = \pi \times D3 \tag{36}$$

Also, r3 is the gap of the radial bearing portion in the radial direction of the shaft. The term "gap" here ignores the depth of the hydrodynamic grooves formed in the radial bearing portion.

Consequently, even if the impact load is applied repeatedly, the lubricant can be prevented more reliably from leaking out of the opened end by satisfying the value of the function P2/Kr corresponding to a specific impact load and bearing shape.

As a result, it is possible to prevent the lubricant from leaking to the outside, and to maintain good seal performance.

The spindle motor according to the eighth invention includes the hydrodynamic bearing device according to the first invention.

Here, the spindle motor is equipped with the hydrodynamic bearing device discussed above.

Consequently, it is possible to provide a spindle motor with which the lubricant is prevented from leaking to the outside, and good seal performance is maintained, even when the bearing device is subjected to external impact.

The hydrodynamic bearing device according to the ninth invention comprises a shaft, a sleeve member, a lubricant, a bearing portion, and a bearing seal portion. The sleeve member has a bearing hole including an open end and a closed end, and is disposed in a state in which the shaft is inserted in the bearing hole with a microscopic gap in between, and in which the sleeve member is capable of rotation relative to the shaft. The lubricant fills the microscopic gap. The bearing portion has a radial bearing portion supporting the shaft and the sleeve member in the radial direction of the shaft via the lubricant, and a thrust bearing portion supporting the shaft and the sleeve member in the axial direction. The bearing seal portion is disposed on an opened end side of the bearing portion, and suppresses leakage of the lubricant from the opened end by capillary force working between the shaft and the sleeve member. The value of a function P2/V1, where V1 implies a fluctuation volume and P2 is a second capillary pressure index, is at least a specific value. V1 and P2 are given below.

$$V1 = \pi \times dg \times dg \times G \tag{101}$$

V1: volume (m³) by which the sleeve member is able to move in the axial direction relative to the shaft dg: outermost radius (m) of the bearing portion at the open end G: distance (m) by which the sleeve member is able to move in the axial direction relative to the shaft $$Fg2o = \pi \times D2 \times \gamma \times \cos\theta \tag{102}$$

$$Fg2i = \pi \times D2i \times \gamma \times \cos\theta \tag{103}$$

$$D2i = D2 - 2 \times r2 \tag{104}$$

$$Fg2 = Fg2o + Fg2i \tag{105}$$

$$Ag2 = \pi \times (D2^2 - D2i^2)/4 \tag{106}$$

$$P2 = Fg2/Ag2 \tag{107}$$

P2: capillary pressure index (Pa) at the vapor-liquid interface located near the interior part of the bearing seal portion γ: surface tension (N/m) of the lubricant θ: contact angle (radians) of the lubricant D2: outside diameter (m) of the interior part of the bearing seal portion r2: lubricant film thickness (m) at the vapor-liquid interface located near the interior part of the bearing seal portion Here, attention is focused on the relation between the second capillary pressure index P2 and the fluctuation volume V1, and the value of the function P2/V1 is set to be at least a specific value.

The "shaft" referred to here also includes a rotor hub, etc., attached to the shaft.

P2 and V1 will each be described below.

The fluctuation volume V1 refers to the volume by which the sleeve member is able to move in the axial direction relative to the shaft, and is expressed by the following relational formula (101).

$$V1 = \pi \times dg \times dg \times G \tag{101}$$

Here, when the bearing seal portion is formed by the outer peripheral surface of the sleeve member and the inner peripheral surface of the rotor hub attached to the shaft, and the thrust bearing portion is disposed near the open end of the sleeve member, for example, then dg, which is the outermost radius of the bearing portion at the open end, refers to the radius of the outermost portion of the thrust bearing portion in the radial direction of the shaft. When the bearing seal portion is formed by the outer peripheral surface of the shaft and the inner peripheral surface of the sleeve member, and the bearing seal portion is disposed near the open end of the sleeve member, for example, then dg refers to the radius of the radial bearing portion.

The second capillary pressure index P2 refers to the capillary pressure index at the interior part of the bearing seal portion, that is, at the vapor-liquid interface located near the interior part of the bearing seal portion, and is expressed by a relational formula (107) derived from the following relational formulas (102) to (106).

$$Fg2o = \pi \times D2 \times \gamma \times \cos\theta \tag{102}$$

$$Fg2i = \pi \times D2i \times \gamma \times \cos\theta \tag{103}$$

$$D2i = D2 - 2 \times r2 \tag{104}$$

$$Fg2 = Fg2o + Fg2i \tag{105}$$

$$Ag2 = \pi \times (D2^2 - D2i^2)/4 \tag{106}$$

$$P2 = Fg2/Ag2 \tag{107}$$

The phrase "the interior part of the bearing seal portion" used here refers to the portion on the interior side from the opened end of the bearing seal portion toward the bearing portion. For instance, if the bearing seal portion has a shape that tapers in the direction in which the gap widens toward the opened end, then the smallest portion of the gap is referred to as the interior part of the bearing seal portion.

Here, r2 is the lubricant film thickness at the vapor-liquid interface located near the interior part of the bearing seal portion. In general, the peripheral faces of the shaft and the sleeve member that form the bearing seal portion (hereinafter referred to as the bearing seal faces) are tilted in the direction in which the gap widens toward the opened end side. There is also a case in which the vapor-liquid interface located near the interior part of the bearing seal portion is formed at an angle, rather than being substantially perpendicular to the axial direction. Therefore, when the inner and outer bearing seal faces form an angle α to each other, there will be a case in which a line that bisects the inner and outer bearing seal faces is angled, in which case if relational formula (102) is strictly expressed, it is given as the following relational formula (102A).

$$Fg2o = \pi \times D2 \times \gamma \times \cos\theta \times \cos(\alpha/2) \quad (102A)$$

The angle α of the above-mentioned bearing seal faces is only about 20 degrees at most, and therefore the inclination of the vapor-liquid interface is only about 10 degrees. Since $\cos(\alpha/2) \approx 0.985$, ignoring the angle α of the bearing seal faces in calculations will have no effect on the relational formula (102).

Further, the bearing seal portion is constituted such that V2, which is the volume of the lubricant reservoir in the bearing seal portion, and V1, which implies the fluctuation volume, satisfy V1<V2.

With a conventional hydrodynamic bearing device, a flange that is integrally attached to the shaft has a gap (looseness) in the axial direction between the sleeve member and a thrust plate, and when the hydrodynamic bearing device is subjected to an impact load in the axial direction, the shaft repeatedly moves in the axial direction, as if the piston of a water pistol were going in and out. The lubricant that fills the bearing gap leaks out of the opening at this point, bubbles form, and before long the lubricant film breaks down. This has been dealt with by keeping the gap in the axial direction within a specific range, and thereby ensuring good impact resistance, but with hydrodynamic bearing devices used in mobile products that may be subjected to higher impact loads, for example, adequate seal performance cannot be maintained.

In view of this, with the hydrodynamic bearing device of the present invention, attention is focused on the relation (P2/V1) between the second capillary pressure index P2, which is believed to be correlated with the seal performance of the bearing seal portion, and the fluctuation volume V1, which is believed to be correlated with impact resistance, and the function P2/V1 is set to be at least a specific value. The critical point at which the lubricant will not leak out from the opened end of the bearing seal portion is then calculated for each assumed impact load and bearing shape, and applied as the above-mentioned specific value.

This means that if the value of the function P2/V1 corresponding to a specific impact load and bearing shape is satisfied, then even if the bearing device is subjected to an impact from the outside, it will be possible to prevent more reliably the lubricant from leaking out from the opened end.

As a result, it is possible to prevent the lubricant from leaking to the outside, and to maintain good seal performance.

The hydrodynamic bearing device according to the tenth invention is the hydrodynamic bearing device according to the ninth invention, wherein a rotor hub member formed from a substantially circular top plate and a cylindrical wall hanging down from the top plate is attached on the open end side of the shaft, the bearing seal portion is formed by the outer peripheral surface of the sleeve member and the inner peripheral surface of the rotor hub member, and the value of the function P2/V1 is at least $1.0 \times 10^{12}$.

Here, the value of the function P2/V1 between V1, which implies the fluctuation volume, and P2, which is the capillary pressure index at the vapor-liquid interface located near the interior part of the bearing seal portion formed by the cylindrical wall of the rotor hub member and the outer peripheral surface of the sleeve member, is set to be at least $1.0 \times 10^{12}$.

This value of $1.0 \times 10^{12}$ is calculated as the critical point at which the lubricant will not leak out from the opened end of the bearing seal portion at an assumed impact load of 2000 G in the above-mentioned hydrodynamic bearing device in which a rotor hub member formed by a substantially circular top plate and a cylindrical wall hanging down from the top plate is attached on the open end side of the shaft, and the bearing seal portion is formed by the outer peripheral surface of the sleeve member and the inner peripheral surface of the rotor hub member.

This makes it possible to prevent the lubricant from leaking to the outside, and to maintain good seal performance, even when a hydrodynamic bearing device of the above shape is subjected to an external impact.

The hydrodynamic bearing device according to the eleventh invention is the hydrodynamic bearing device according to the ninth invention, wherein the bearing seal portion is formed by the outer peripheral surface of the shaft and the inner peripheral surface of the sleeve member, and the value of the function P2/V1 is at least $6.0 \times 10^{12}$.

Here, the value of the function P2/V1 between V1, which implies the fluctuation volume, and P2, which is the capillary pressure index at the vapor-liquid interface located near the interior part of the bearing seal portion formed by the outer peripheral surface of the shaft and the inner peripheral surface of the sleeve member, is set to be at least $6.0 \times 10^{12}$.

This value of $6.0 \times 10^{12}$ is calculated as the critical point at which the lubricant will not leak out from the opened end of the bearing seal portion at an assumed impact load of 2000 G in the above-mentioned hydrodynamic bearing device in which the bearing seal portion is formed by the outer peripheral surface of the shaft and the inner peripheral surface of the sleeve member.

This makes it possible to prevent the lubricant from leaking to the outside, and to maintain good seal performance, even when a hydrodynamic bearing device of the above shape is subjected to an external impact.

The hydrodynamic bearing device according to the twelfth invention is the hydrodynamic bearing device according to the ninth invention, wherein the value of a function $(P1/V1) \times D1 \times D1 \times L$, where V1 implies the fluctuation volume, P1 is the first capillary pressure index, D1 is the outside diameter of the vapor-liquid interface located near the opened end of the bearing seal portion, and L is the bearing length, which is the length in the axial direction of the portion filled with the lubricant, satisfies the following relation formula (108):

$$(P1/V1) \times D1 \times D1 \times L \geq 45{,}000 \quad (108)$$

Here, it is surmised that any bubbles that work their way into the radial bearing portion will be more likely to be discharged outside of the radial bearing portion if the opening surface area is greater, and that even if bubbles should be trapped inside the bearing portion, the longer is the bearing portion, the less the bubbles will diminish performance, so with the hydrodynamic bearing device of the present invention, the value of the function $(P1/V1) \times D1 \times D1 \times L$ is set to be at least a specific value.

Here, the function $(P1/V1) \times D1 \times D1 \times L$ includes $D1 \times D1$, which is the correlation with the opening surface area at the opened end of the bearing seal portion, and L, which is the length of the radial bearing portion. If the specific value is set to at least 45,000, the loss of performance caused by bubbles in the radial bearing portion can be minimized.

As a result, it is possible to prevent a decrease in seal performance due to bubbles in the radial bearing portion.

The hydrodynamic bearing device according to the thirteenth invention is the hydrodynamic bearing device according to the ninth invention, wherein the value of a function $(P1/V1) \times D1 \times D1 \times r3 \times L$, where V1 is the fluctuation volume, P1 is the first capillary pressure index, D1 is the outside diameter of the vapor-liquid interface located near the opened end of the bearing seal portion, L is the bearing length, which is the length in the axial direction of the portion filled with the lubricant, and r3 is the gap of the radial bearing portion in the radial direction of the shaft, satisfies the following relation formula (109):

$$(P1/V1) \times D1 \times D1 \times r3 \times L \geq 0.1 \quad (109)$$

Here, it is surmised that any bubbles that work their way into the radial bearing portion will be more likely to be discharged outside of the bearing portion if the opening surface area is greater, and that even if bubbles should be trapped inside the bearing portion, the greater is the volume of the bearing portion, the less the bubbles will diminish performance, so with the hydrodynamic bearing device of the present invention, the value of the function $(P1/V1) \times D1 \times D1 \times r3 \times L$ is set to be at least a specific value.

Here, the function $(P1/V1) \times D1 \times D \times r3 \times L$ includes $D1 \times D1$, which is the correlation with the opening surface area at the opened end of the bearing seal portion, and $r3 \times L$, which is the correlation with the volume of the radial bearing portion. If the specific value is set to at least 0.1, the loss of performance caused by bubbles in the radial bearing portion can be minimized.

As a result, it is possible to prevent a decrease in seal performance due to bubbles in the radial bearing portion.

The hydrodynamic bearing device according to the fourteenth invention is the hydrodynamic bearing device according to the ninth invention, wherein the value of a function P2/Kr, where P2 is a second capillary pressure index and Kr is a channel resistance coefficient, is at least a specific value. P2 and Kr are given as follows.

$$Fg2o = \pi \times D2 \times \gamma \times \cos\theta \quad (122)$$

$$Fg2i = \pi \times D2i \times \gamma \times \cos\theta \quad (123)$$

$$D2i = D2 - 2 \times r2 \quad (124)$$

$$Fg2 = Fg2o + Fg2i \quad (125)$$

$$Ag2 = \pi \times (D2^2 - D2i^2)/4 \quad (126)$$

$$P2 = Fg2/Ag2 \quad (127)$$

P2: capillary pressure index (Pa) at the vapor-liquid interface located near the interior part of the bearing seal portion
γ: surface tension (N/m) of the lubricant
θ: contact angle (radians) of the lubricant
D2: outside diameter (m) of the interior part of the bearing seal portion
r2: lubricant film thickness (m) at the vapor-liquid interface located near the interior part of the bearing seal portion $$Kr = 12 \times \mu \times Lr \times (T \times r3 \times r3 \times r3) \quad (128)$$

Kr: channel resistance coefficient
r3: gap (m) of the radial bearing portion in the radial direction of the shaft
Lr: radial bearing portion length (m)

$$T = \pi \times D3 \quad (129)$$

T: channel width (m)
D3: outside diameter (m) of the shaft

Here, attention is focused on the fact that Kr, which is the channel resistance at the radial bearing portion, should be made sufficiently small with respect to P2, which is the capillary pressure index at the interior part of the bearing seal portion, in order to return the lubricant to the bearing gap at the instant the impact load is released, and with the hydrodynamic bearing device of the present invention the value of the function P2/Kr is set to be at least a specific value. The critical point at which the lubricant will not leak out from the opened end of the bearing seal portion is then calculated for the assumed impact load and bearing shape, and applied as the above-mentioned specific value.

Leakage of the lubricant is more pronounced if the impact load is applied repeatedly, and the reason for this is believed to be that the lubricant that has been moved by the impact load to the lubricant reservoir in the bearing seal portion is subjected to the next impact load before it is returned to the gap of the radial bearing portion by surface tension.

P2 and Kr are each discussed below.

The second capillary pressure index P2 refers to the capillary pressure index at the interior part of the bearing seal portion, that is, at the vapor-liquid interface located near the interior part of the bearing seal portion, and is expressed by a relational formula (127) derived from the following relational formulas (122) to (126).

$$Fg2o = \pi \times D2 \times \gamma \times \cos\theta \quad (122)$$

$$Fg2i = \pi \times D2i \times \gamma \times \cos\theta \quad (123)$$

$$D2i = D2 - 2 \times r2 \quad (124)$$

$$Fg2 = Fg2o + Fg2i \quad (125)$$

$$Ag2 = \pi \times (D2^2 - D2i^2)/4 \quad (126)$$

$$P2 = Fg2/Ag2 \quad (127)$$

The phrase "the interior part of the bearing seal portion" used here refers to the portion on the interior side from the opened end of the bearing seal portion toward the bearing portion. For instance, if the bearing seal portion has a shape that tapers in the direction in which the gap widens toward the opened end, then the smallest portion of the gap is referred to as the interior part of the bearing seal portion.

The channel resistance coefficient Kr refers to the channel resistance coefficient at the radial bearing portion, and is expressed by the following relational formula (128).

$$Kr = 12 \times \mu \times Lr \times (T \times r3 \times r3 \times r3) \quad (128)$$

Here, Lr is the length of the radial bearing portion in the axial direction. For example, when the radial bearing portion is formed at two places (two steps) in the axial direction, this refers to the sum of the lengths of both bearing portions.

The channel width T is calculated from the following relational formula (129), and D3 is the outside diameter of the shaft.

$$T = \pi \times D3 \quad (129)$$

Also, r3 is the gap of the radial bearing portion in the radial direction of the shaft. The term "gap" here ignores the depth of the hydrodynamic grooves formed in the radial bearing portion.

Consequently, even if the impact load is applied repeatedly, the lubricant can be prevented more reliably from leaking out of the opened end by satisfying the value of the function P2/Kr corresponding to a specific impact load and bearing shape.

As a result, it is possible to prevent the lubricant from leaking to the outside, and to maintain good seal performance.

The spindle motor according to the fifteenth invention includes the hydrodynamic bearing device according to the ninth invention.

Here, the spindle motor is equipped with the hydrodynamic bearing device discussed above.

Consequently, it is possible to provide a spindle motor with which the lubricant is prevented from leaking to the outside, and good seal performance is maintained, even when the bearing device is subjected to external impact.

The hydrodynamic bearing device according to the sixteenth invention comprises a shaft, a sleeve member, a lubricant, a bearing portion, and a bearing seal portion. The sleeve member has a bearing hole including an open end and a closed end, and is disposed in a state in which the shaft is inserted in the bearing hole with a microscopic gap in between, and in which the sleeve member is capable of rotation relative to the shaft. The lubricant fills the microscopic gap. The bearing portion has a radial bearing portion supporting the shaft and the sleeve member in the radial direction of the shaft via the lubricant, and a thrust bearing portion supporting the shaft and the sleeve member in the axial direction. The bearing seal portion is disposed on an opened end side of the bearing portion, and suppresses leakage of the lubricant from the opened end by capillary force working between the shaft and the sleeve member. The value of a function P2/Kr, where P2 is a second capillary pressure index coefficient and Kr is channel resistance, is at least a specific value. P2 and Kr are given below.

$$Fg2o = \pi \times D2 \times \gamma \times \cos\theta \quad (201)$$

$$Fg2i = \pi \times D2i \times \gamma \times \cos\theta \quad (202)$$

$$D2i = D2 - 2 \times r2 \quad (203)$$

$$Fg2 = Fg2o + Fg2i \quad (204)$$

$$Ag2 = \pi \times (D2^2 - D2i^2)/4 \quad (205)$$

$$P2 = Fg2/Ag2 \quad (206)$$

P2: capillary pressure index (Pa) at the vapor-liquid interface located near the interior part of the bearing seal portion
$\gamma$: surface tension (N/m) of the lubricant
$\theta$: contact angle (radians) of the lubricant
D2: outside diameter (m) of the interior part of the bearing seal portion
r2: lubricant film thickness (m) at the vapor-liquid interface located near the interior part of the bearing seal portion $$Kr = 12 \times \mu \times Lr \times (T \times r3 \times r3 \times r3) \quad (207)$$

Kr: channel resistance coefficient
r3: gap (m) of the radial bearing portion in the radial direction of the shaft
Lr: radial bearing portion length (m)

$$T = \pi \times D3 \quad (208)$$

T: channel width (m)
D3: outside diameter (m) of the shaft

Here, attention is focused on the relation between the second capillary pressure index P2 and the channel resistance coefficient Kr, and the value of the function P2/Kr is set to be at least a specific value.

The "shaft" referred to here also includes a rotor hub, etc., attached to the shaft.

P2 and Kr will each be described below.

The second capillary pressure index P2 refers to the capillary pressure index at the interior part of the bearing seal portion, that is, at the vapor-liquid interface located near the interior part of the bearing seal portion, and is expressed by a relational formula (206) derived from the following relational formulas (201) to (205).

$$Fg2o = \pi \times D2 \times \gamma \times \cos\theta \quad (201)$$

$$Fg2i = \pi \times D2i \times \gamma \times \cos\theta \quad (202)$$

$$D2i = D2 - 2 \times r2 \quad (203)$$

$$Fg2 = Fg2o + Fg2i \quad (204)$$

$$Ag2 = \pi \times (D2^2 - D2i^2)/4 \quad (205)$$

$$P2 = Fg2/Ag2 \quad (206)$$

The phrase "the interior part of the bearing seal portion" used here refers to the portion on the interior side from the opened end of the bearing seal portion toward the bearing portion. For instance, if the bearing seal portion has a shape that tapers in the direction in which the gap widens toward the opened end, then the smallest portion of the gap is referred to as the interior part of the bearing seal portion.

Here, r2 is the lubricant film thickness at the vapor-liquid interface located near the interior part of the bearing seal portion. In general, the peripheral faces of the shaft and the sleeve member that form the bearing seal portion (hereinafter referred to as the bearing seal faces) are tilted in the direction in which the gap widens toward the opened end side. There is also a case in which the vapor-liquid interface located near the interior part of the bearing seal portion is formed at an angle, rather than being substantially perpendicular to the axial direction. Therefore, when the inner and outer bearing seal faces form an angle $\alpha$ to each other, there will be a case in which a line that bisects the inner and outer bearing seal faces is angled, in which case if relational formula (201) is strictly expressed, it is given as the following relational formula (201A).

$$Fg2o = \pi \times D2 \times \gamma \times \cos\theta \times \cos(\alpha/2) \quad (201A)$$

The angle $\alpha$ of the above-mentioned bearing seal faces is only about 20 degrees at most, and therefore the inclination of the vapor-liquid interface is only about 10 degrees. Since $\cos(\alpha/2) \approx 0.985$, ignoring the angle $\alpha$ of the bearing seal faces in calculations will have no effect on the relational formula (201).

The channel resistance coefficient Kr refers to the channel resistance coefficient at the radial bearing portion, and is expressed by the following relational formula (207).

$$Kr = 12 \times \mu \times Lr \times (T \times r3 \times r3 \times r3) \quad (207)$$

Here, Lr is the length of the radial bearing portion in the axial direction. For example, when the radial bearing portion is formed at two places (two steps) in the axial direction, this refers to the sum of the lengths of both bearing portions.

The channel width T is calculated from the following relational formula (208), and D3 is the outside diameter of the shaft.

$$T = \pi \times D3 \quad (208)$$

Also, r3 is the gap of the radial bearing portion in the radial direction of the shaft. The term "gap" here ignores the depth of the hydrodynamic grooves formed in the radial bearing portion.

With a conventional hydrodynamic bearing device, a flange that is integrally attached to the shaft has a gap (looseness) in the axial direction between the sleeve member and a thrust plate, and when the hydrodynamic bearing device is subjected to an impact load in the axial direction, the shaft repeatedly moves in the axial direction, as if the piston of a water pistol were going in and out. The lubricant that fills the bearing gap leaks out of the opening at this point, bubbles form, and before long the lubricant film breaks down. This has been dealt with by keeping the gap in the axial direction within a specific range, and thereby ensuring good impact resistance, but with hydrodynamic bearing devices used in mobile products that may be subjected to higher impact loads, for example, adequate seal performance cannot be maintained.

Leakage of the lubricant is more pronounced if the impact load is applied repeatedly, and the reason for this is believed to be that the lubricant that has been moved by the impact load to the lubricant reservoir in the bearing seal portion is subjected to the next impact load before it is returned to the gap of the radial bearing portion by surface tension.

Here, attention is focused on the fact that Kr, which is the channel resistance at the radial bearing portion, should be made sufficiently small with respect to P2, which is the capillary pressure index at the interior part of the bearing seal portion, in order to return the lubricant to the bearing gap at the instant the impact load is released, and with the hydrodynamic bearing device of the present invention the value of the function P2/Kr is set to be at least a specific value. The critical point at which the lubricant will not leak out from the opened end of the bearing seal portion is then calculated for the assumed impact load and bearing shape, and applied as the above-mentioned specific value.

Consequently, even if the impact load is applied repeatedly, the lubricant can be prevented more reliably from leaking out of the opened end by satisfying the value of the function P2/Kr corresponding to a specific impact load and bearing shape.

As a result, it is possible to prevent the lubricant from leaking to the outside, and to maintain good seal performance.

The hydrodynamic bearing device according to the seventeenth invention is the hydrodynamic bearing device according to the sixteenth invention, wherein a rotor hub member formed from a substantially circular top plate and a cylindrical wall hanging down from the top plate is attached on the open end side of the shaft, the bearing seal portion is formed by the outer peripheral surface of the sleeve member and the inner peripheral surface of the rotor hub member, and the value of the function P2/Kr is at least $7.0 \times 10^{-14}$.

Here, the value of the function P2/Kr between P2, which is the capillary pressure index at the vapor-liquid interface located near the interior part of the bearing seal portion, and Kr, which is the channel resistance coefficient at the radial bearing portion, is set to be at least $7.0 \times 10^{-14}$.

This value of $7.0 \times 10^{-14}$ is calculated as the critical point at which the lubricant will not leak out from the opened end of the bearing seal portion at an assumed impact load of 2000 G in the above-mentioned hydrodynamic bearing device in which a rotor hub member formed by a substantially circular top plate and a cylindrical wall hanging down from the top plate is attached on the open end side of the shaft the bearing seal portion is formed by the outer peripheral surface of the sleeve and the inner peripheral surface of the rotor hub member.

This makes it possible to prevent the lubricant from leaking to the outside, and to maintain good seal performance, even when a hydrodynamic bearing device of the above shape is subjected to an external impact.

The hydrodynamic bearing device according to the eighteenth invention is the hydrodynamic bearing device according to the sixteenth invention, wherein the bearing seal portion is formed by the outer peripheral surface of the shaft and the inner peripheral surface of the sleeve member, and the value of the function P2/Kr is at least $1.5 \times 10^{-16}$.

Here, the value of the function P2/Kr between P2, which is the capillary pressure index at the vapor-liquid interface located near the interior part of the bearing seal portion, and Kr, which is the channel resistance coefficient at the radial bearing portion, is set to be at least $1.5 \times 10^{-16}$.

This value of $1.5 \times 10^{-16}$ is calculated as the critical point at which the lubricant will not leak out from the opened end of the bearing seal portion at an assumed impact load of 2000 G in the above-mentioned hydrodynamic bearing device in which the bearing seal portion is formed by the outer peripheral surface of the shaft and the inner peripheral surface of the sleeve member.

This makes it possible to prevent the lubricant from leaking to the outside, and to maintain good seal performance, even when a hydrodynamic bearing device of the above shape is subjected to an external impact.

The hydrodynamic bearing device according to the nineteenth invention is the hydrodynamic bearing device according to the eighteenth invention, wherein the value of a function (P1/V1)×D1×D1×L, where V1 is the fluctuation volume, P1 is the first capillary pressure index, D1 is the outside diameter of the vapor-liquid interface located near the opened end of the bearing seal portion, and L is the bearing length, which is the length in the axial direction of the portion filled with the lubricant, satisfies the following relation formula (209):

$$(P1/V1) \times D1 \times D1 \times L \geqq 45{,}000 \tag{209}$$

Here, it is surmised that any bubbles that work their way into the radial bearing portion will be more likely to be discharged outside of the radial bearing portion if the opening surface area is greater, and that even if bubbles should be trapped inside the bearing portion, the longer is the bearing portion, the less the bubbles will diminish performance, so with the hydrodynamic bearing device of the present invention, the value of the function (P1/V1)×D1×D1×L is set to be at least a specific value.

Here, the function (P1/V1)×D1×D1×L includes D1×D1, which is the correlation with the opening surface area at the opened end of the bearing seal portion, and L, which is the length of the radial bearing portion. If the specific value is set to at least 45,000, the loss of performance caused by bubbles in the radial bearing portion can be minimized.

As a result, it is possible to prevent a decrease in seal performance due to bubbles in the radial bearing portion.

The hydrodynamic bearing device according to the twentieth invention is the hydrodynamic bearing device according to the sixteenth invention, wherein the value of a function (P1/V1)×D1×D1×r3×L, where V1 is the fluctuation volume, P1 is the first capillary pressure index, D1 is the outside diameter of the vapor-liquid interface located near the opened end of the bearing seal portion, L is the bearing length, which is the length in the axial direction of the portion filled with the lubricant, and r3 is the gap of the radial bearing portion in the radial direction of the shaft, satisfies the following relation formula (210):

$$(P1/V1) \times D1 \times D1 \times r3 \times L \geqq 0.1 \tag{210}$$

Here, it is surmised that any bubbles that work their way into the radial bearing portion will be more likely to be discharged outside of the bearing portion if the opening surface area is greater, and that even if bubbles should be trapped inside the bearing portion, the greater is the volume of the radial bearing portion, the less the bubbles will diminish performance, so with the hydrodynamic bearing device of the present invention, the value of the function (P1/V1)×D1×D1×r3×L is set to be at least a specific value.

Here, the function (P1/V1)×D1×D1×r3×L includes D1×D1, which is the correlation with the opening surface area at the opened end of the bearing seal portion, and r3×L, which is the correlation with the volume of the radial bearing portion. If the specific value is set to at least 0.1, the loss of performance caused by bubbles in the radial bearing portion can be minimized.

As a result, it is possible to prevent a decrease in seal performance due to bubbles in the radial bearing portion.

The spindle motor according to the twenty-first invention includes the hydrodynamic bearing device according to the sixteenth invention.

Here, the spindle motor is equipped with the hydrodynamic bearing device discussed above.

Consequently, it is possible to provide a spindle motor with which the lubricant is prevented from leaking to the outside, and good seal performance is maintained, even when the bearing device is subjected to external impact.

Effects of the Invention

With the hydrodynamic bearing device according to the present invention, the lubricant is prevented from leaking to the outside, and good seal performance is maintained.

DETAILED DESCRIPTION OF THE INVENTION

A spindle motor 1 including a hydrodynamic bearing device 30 according to an embodiment of the present invention will now be described through reference to FIGS. 1 to 7.

Figure 1:
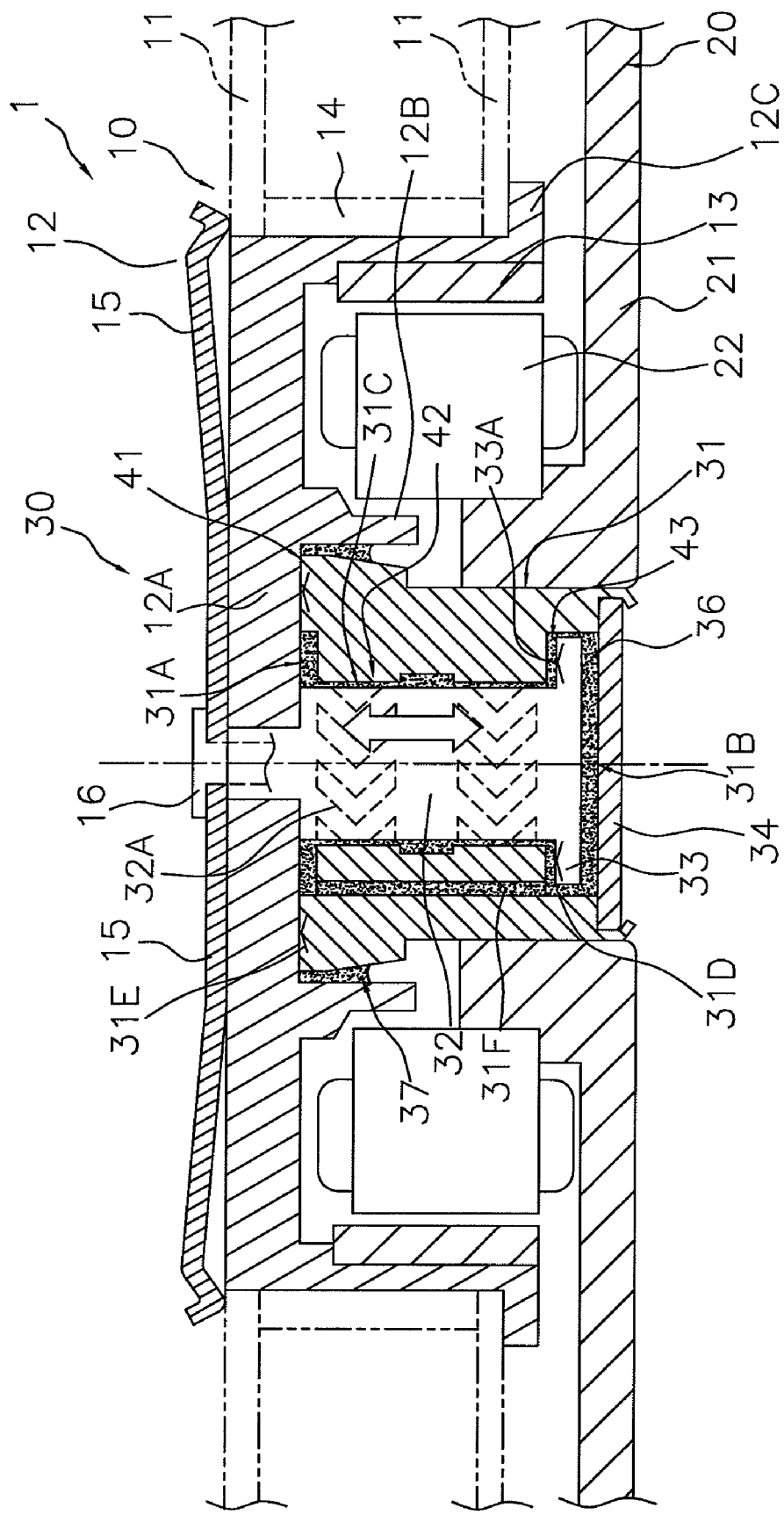
FIG. 1 is a simplified vertical cross section of a spindle motor that includes the hydrodynamic bearing device according to an embodiment of the present invention.

In the following description, the up and down directions in FIG. 1 are referred to as the axial direction, with the upward direction being referred to as the "upward axial direction" (outward axial direction) and the downward direction as the "downward axial direction" (inward axial direction), but these are not intended to limit the actual attachment directions of the hydrodynamic bearing device 30.

Overall Configuration of Spindle Motor 1

The spindle motor 1 is an apparatus for rotationally driving a recording disk 11, and as shown in FIG. 1, it mainly comprises a rotating member 10, a stationary member 20, and the hydrodynamic bearing device 30.

The rotating member 10 mainly comprises a hub (rotor hub) 12 on which the recording disk 11 is mounted, and a rotor magnet 13 that constitutes a magnetic circuit along with a stator 22 (discussed below).

The hub 12 integrally formed a substantially circular top plate portion 12A, a cylindrical wall portion 12B that hangs down from the top plate portion 12A, and a disk placement portion 12C disposed around the outer peripheral part in the downward axial direction. Two, for example, recording disks 11 are fitted via an annular spacer 14 on the outer peripheral side of the hub 12, and placed over the disk placement portion 12C. A damper 15 is fixed with a screw 16 in the upward axial direction of a shaft 32, and the hub 12 is fixed by press fitting and/or adhesive bonding to the shaft 32, or the two members are formed integrally. The recording disks 11 are pressed in the downward axial direction by the damper 15, and clamped between the damper 15 and the disk mounting portion 12C.

The rotor magnet 13 is fixed to the inner peripheral side of the hub 12, and constitutes a magnetic circuit along with the stator 22 (discussed below).

The stationary member 20 is fixed to a housing of a recording disk drive apparatus (not shown), and is constituted mainly by a base 21 and the stator 22 that is fixed to the base 21. The stator 22 is disposed opposite the inner peripheral side of the rotor magnet 13 in the radial direction. The hydrodynamic bearing device 30 is fixed to the middle part of the base 21. The hydrodynamic bearing device 30 supports the rotating member 10 so as to be capable of rotating with respect to the stationary member 20.

Configuration of Hydrodynamic Bearing Device 30

Figure 2:
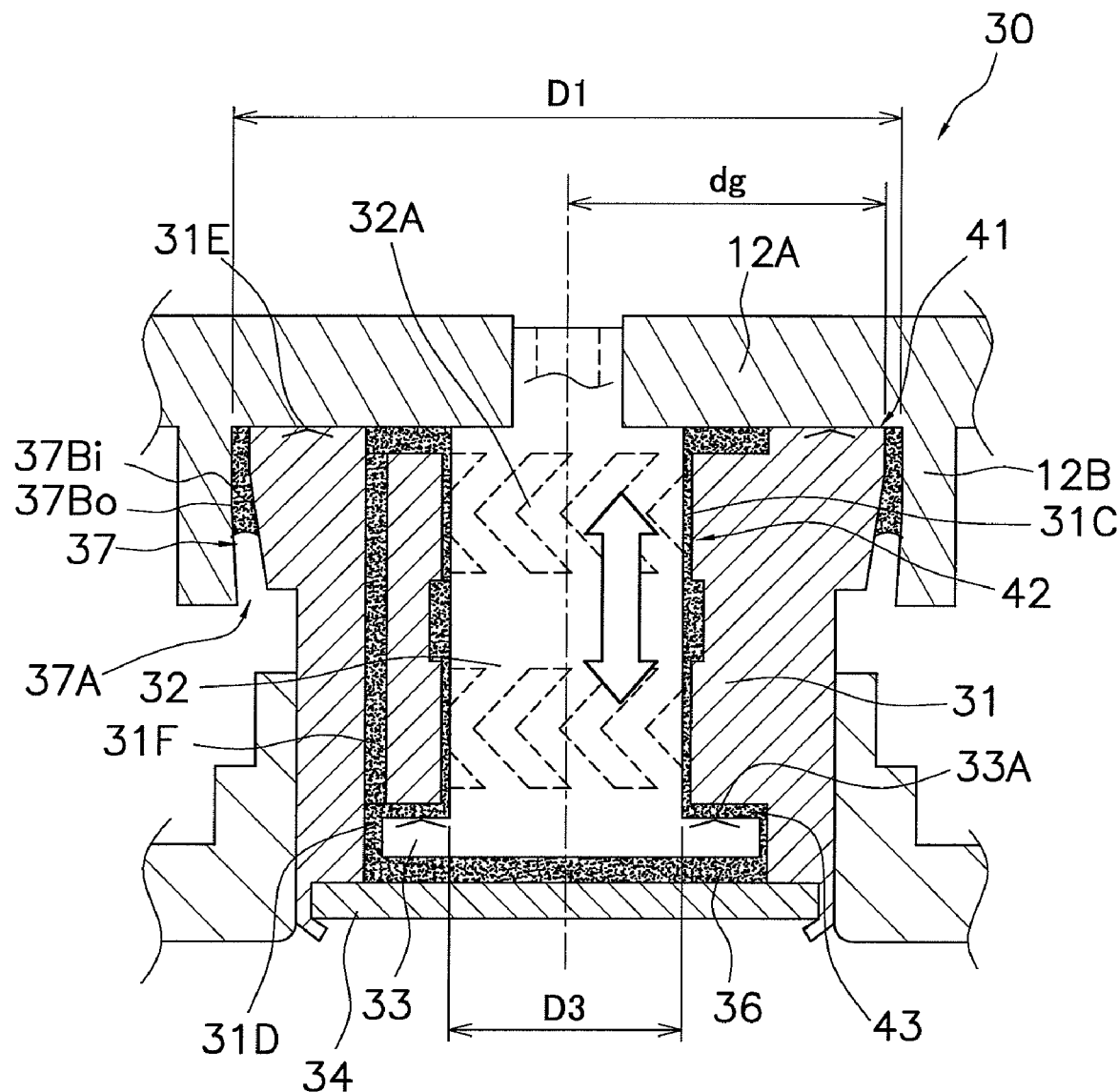
FIG. 2 is a detail diagram of the hydrodynamic bearing device included in the spindle motor of FIG. 1.

As shown in FIG. 2, the hydrodynamic bearing device 30 mainly comprises a sleeve (sleeve member) 31, the shaft 32, a flange 33, a thrust plate 34, a lubricant 36, and a bearing seal portion 37. The sleeve 31 and the thrust plate 34 constitute the stationary member, and the shaft 32 and the flange 33 constitute the rotary member.

The sleeve 31 is a cylindrical member that extends in the axial direction, and is fixed to the base 21 by adhesive bonding or the like. A bearing hole 31C that includes an open end 31A and a closed end 31B formed by the thrust plate 34 or the like is formed in the sleeve 31. Also, a plurality of thrust hydrodynamic grooves 31E are formed in the upper end face of the sleeve 31, and a thrust bearing portion 41 having the thrust hydrodynamic grooves 31E is formed between the sleeve 31 and the hub 12. The thrust hydrodynamic grooves 31E have a spiral pattern, for example. The thrust bearing portion 41 generates support pressure, so that the shaft 32 and the rotating member 10 are supported in the axial direction. The thrust hydrodynamic grooves 31E may instead have a herringbone pattern.

The shaft 32 is a cylindrical member that extends in the axial direction, and rotatably supports the hub 12. More specifically, the shaft 32 is disposed so as to be capable of relative rotation via a gap on the inner peripheral side of the sleeve 31, and the hub 12 is fixed to the end of the shaft 32 in the upward axial direction. A plurality of radial hydrodynamic grooves 32A are formed on either the outer peripheral surface of the shaft 32 or the inner peripheral surface of the bearing hole 31C, and a radial bearing portion 42 having the radial hydrodynamic grooves 32A is formed between the sleeve 31 and the shaft 32. The radial hydrodynamic grooves 32A have a herringbone pattern that is asymmetric in the axial direction, for example. The shaft 32 and the rotating member 10 are supported in the radial direction by support pressure generated by the radial bearing portion 42.

The flange 33 is a disk-shaped member, and is fixed to the end of the shaft 32 in the downward axial direction. A plurality of thrust hydrodynamic grooves 33A are formed on the face of the flange 33 in the upward axial direction, and a thrust bearing portion 43 having the thrust hydrodynamic grooves 33A is formed between the flange 33 and the sleeve 31. The rust hydrodynamic grooves 33A have a spiral pattern, for example. The shaft 32 and the rotating member 10 are supported in the axial direction by support pressure generated by the thrust bearing portion 43. The shaft 32 and the flange 33 may also be formed integrally. Also, the thrust hydrodynamic grooves 33A may have a herringbone pattern instead.

An annular recess 31D is formed at the end of the sleeve 31 in the downward axial direction, and the outer peripheral part of the flange 33 is housed between the recess 3 ID and the thrust plate 34.

A communicating hole 31F is formed in the sleeve 31. More specifically, as shown in FIGS. 1 and 2, the communicating hole 3 IF passes near the recess 31 D and through the upper end face of the sleeve 31 in the axial direction.

The bearing seal portion 37 is disposed on an opened end 37A side of the thrust bearing portion 41, and is formed by the outer peripheral surface of the sleeve 31 and the inner peripheral surface of the cylindrical wall portion 12B that hangs down from the top plate portion 12A. An inner peripheral surface 37Bi of the cylindrical wall portion 12B and an outer peripheral surface 37Bo of the sleeve 31 forming the bearing seal portion 37 are inclined in the direction in which the gap of the bearing seal portion 37 widens toward the opened end 37A side.

The thrust bearing portion 41, the radial bearing portion 42, the thrust bearing portion 43, and the communicating hole 31F are filled with the lubricant 36. Examples of the lubricant 36 include low-viscosity ester oils, super-fluidity grease, and ionic liquids.

Operation of Hydrodynamic Bearing Device 30, and Mechanism of Lubricant 36 Leakage The operation of the hydrodynamic bearing device 30 will now be described.

With the hydrodynamic bearing device 30, a rotary magnetic field is generated when power is sent to the stator 22, and rotational force is imparted to the rotor magnet 13. This causes the rotating member 10 to start rotating along with the shaft 32. When the shaft 32 rotates, support pressure is generated in the radial and axial directions in the hydrodynamic grooves 31E, 32A, and 33A. As a result, the shaft 32 is supported in a state of non-contact with respect to the sleeve 31. Specifically, the rotating member 10 is able to rotate in a state of non-contact with respect to the stationary member 20, and this allows the recording disk 11 to rotate at high speed and accuracy. Therefore, data can be recorded to and reproduced from the recording disk 11 by using a magnetic head or optical head (not shown).

The mechanism by which the lubricant 36 leaks out from the opened end 37A will now be described.

Figure 3A:
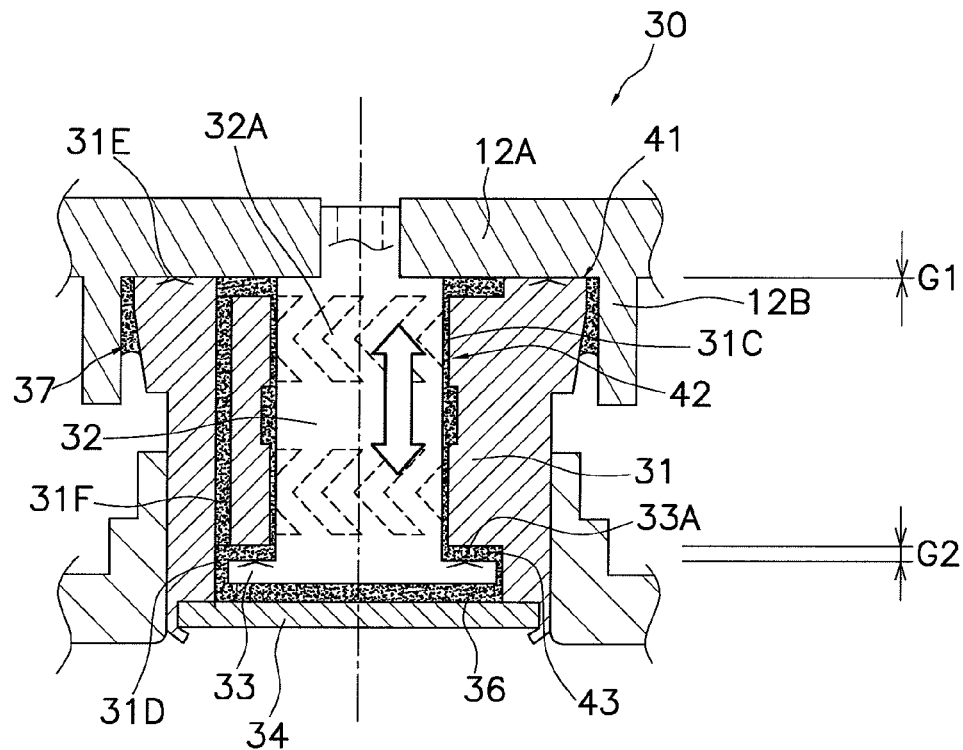
FIGS. 3A and 3B are diagrams of the behavior of the hydrodynamic bearing device when subjected to an impact load.

FIG. 3A is a diagram of the positional relationship of the sleeve 31 and the shaft 32 before rotational force is imparted to the rotor magnet 13, that is, before the rotating member 10 starts to rotate along with the shaft 32. Before the rotating member 10 starts to rotate along with the shaft 32, the gap G1 between the hub 12 and the sleeve 31 is zero.

Figure 3B:
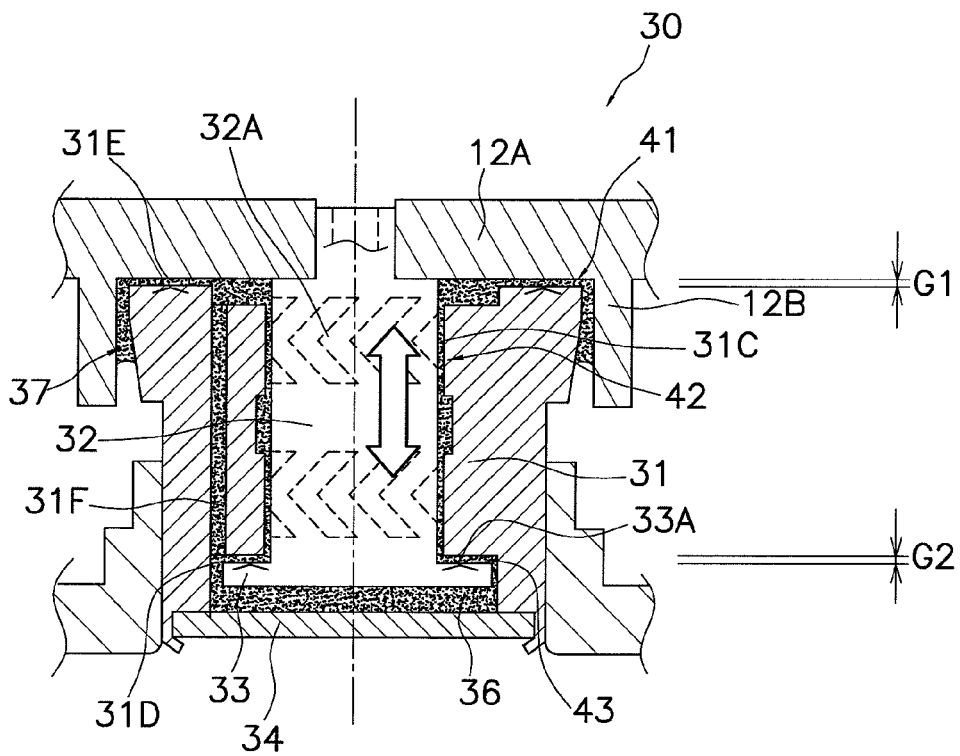

FIG. 3B is a diagram of the positional relationship of the sleeve 31 and the shaft 32 when power has been sent to the stator 22 and rotational force imparted to the rotor magnet 13. When the shaft 32 rotates, the lubricant 36 around the hydrodynamic grooves 31E, 32A, and 33A is scraped together by these hydrodynamic grooves, and pressure is generated by the thrust hydrodynamic grooves 31E. As shown in FIG. 3B, the shaft 32 lifts up with respect to the hub 12 by the lubricant film thickness G1. A gap G2 (shown in FIG. 3B) is formed between the flange 33 and the sleeve 31.

Here, when the hydrodynamic bearing device 30 is subjected to a falling impact load in the direction indicated by the white arrow in FIG. 1, the shaft 32 repeatedly moves in the axial direction, as if the piston of a water pistol were going in and out. The lubricant 36 at this point leaks out from the opened end 37A of the bearing seal portion 37, and bubbles flow into the opened end 37A.

In the past, impact resistance was increased by setting the value of the movable gap in the axial direction (G1+G2) to within a specific range in order to solve this problem of lubricant 36 leakage. However, with a hydrodynamic bearing device that needed to be impact resistant up to 2000 G, such as those installed in mobile devices, leakage of the lubricant 36 could not be prevented with conventional methods.

WORKING EXAMPLE 1

With the hydrodynamic bearing device 30 installed in the spindle motor 1 of this embodiment, attention was focused on the relation (P1/V1) between the first capillary pressure index P1, which is believed to be correlated with the seal performance of the bearing seal portion 37, and the fluctuation volume V1, which is believed to be correlated with impact resistance, and the inventors concluded that if the function P1/V1 were set to be at least a specific value, a hydrodynamic bearing device 30 with superior impact resistance might be obtained.

The fluctuation volume V1 refers to the volume by which the sleeve 31 is able to move in the axial direction relative to the shaft 32, and is expressed by the following relational formula (1).

$$V1 = \pi \times dg \times dg \times G \quad (1)$$

Figure 4:
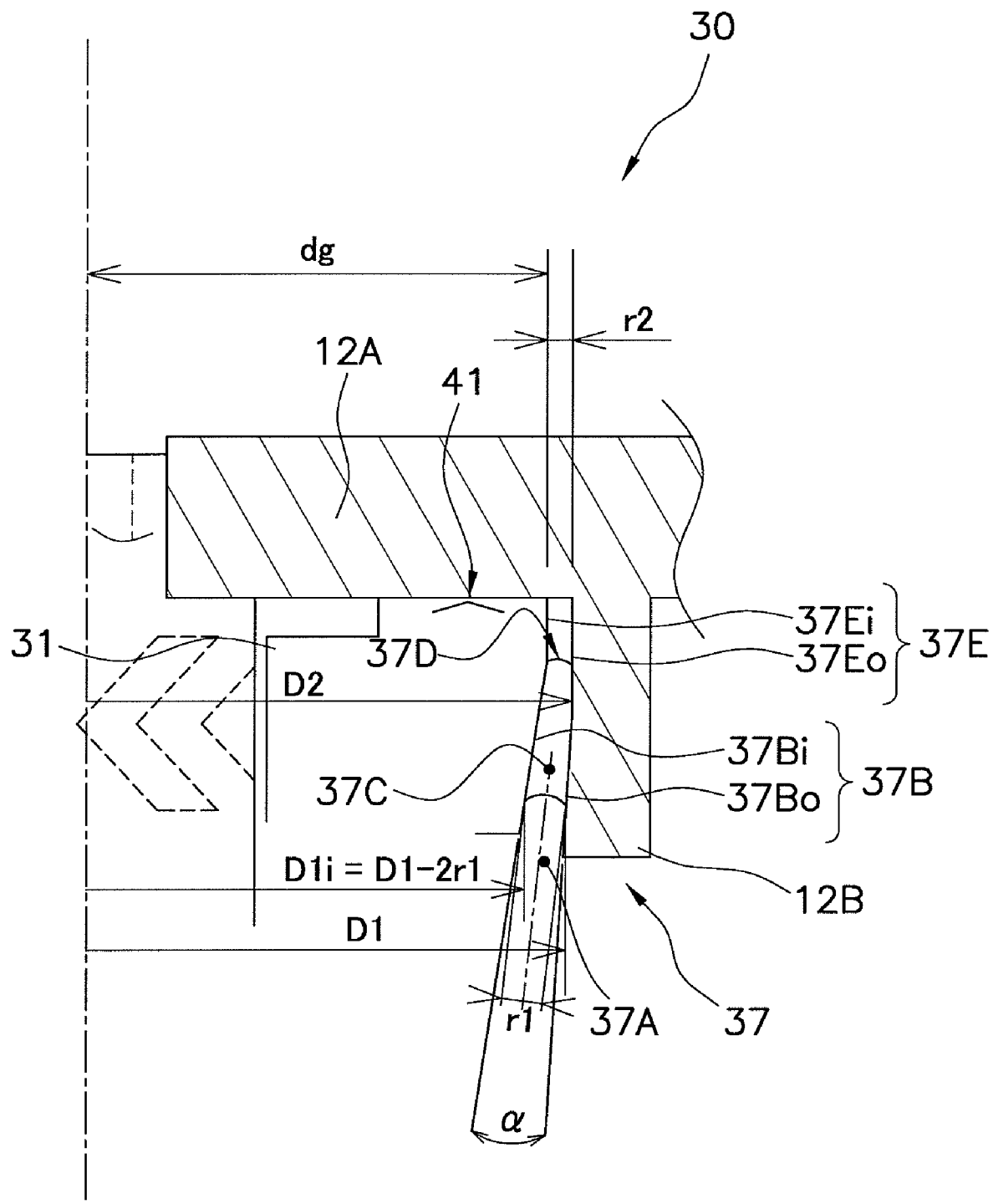
FIG. 4 is a detail diagram of the bearing seal portion included in the hydrodynamic bearing device of FIG. 2.

As shown in FIG. 4, dg refers to the radius of the outermost portion of the thrust bearing portion 41 in the radial direction of the shaft. As shown in FIG. 3B, G refers to the gap (G1+G2) by which the rotating member 10 can move in the axial direction during rotation.

The first capillary pressure index P1 refers to the capillary pressure index at the vapor-liquid interface located near the opened end 37A of the bearing seal portion 37, and is expressed by a relational formula (7) derived from the following relational formulas (2) to (6).

$$Fg1o = \pi \times D1 \times \gamma \times \cos\theta \quad (2)$$

$$Fg1i = \pi \times D1i \times \gamma \times \cos\theta \quad (3)$$

$$D1i = D1 - 2 \times r1 \quad (4)$$

$$Fg1 = Fg1o + Fg1i \quad (5)$$

$$Ag1 = \pi \times (D1^2 - D1i^2)/4 \quad (6)$$

$$P1 = Fg1/Ag1 \quad (7)$$

As shown in FIG. 4, D1 is the outside diameter of the vapor-liquid interface located near the opened end 37A of the bearing seal portion 37.

As shown in FIG. 4, r1 is the lubricant film thickness at the vapor-liquid interface located near the opened end 37A.

Here, as with the hydrodynamic bearing device 30 in this embodiment, the peripheral faces of the shaft 32 and the sleeve 31 forming the bearing seal portion 37 (hereinafter referred to as the bearing seal faces 37B) are inclined in the direction in which the gap widens toward the opened end 37A. As shown in FIG. 4, there is also a case in which the vapor-liquid interface located near the opened end 37A is also formed at an angle, rather than being substantially perpendicular to the axial direction. Therefore, when the inner and outer bearing seal faces 37Bi and 37Bo form an angle α to each other, there will be a case in which a line that bisects the inner and outer bearing seal faces 37Bi and 37Bo is angled (2/α), in which case if relational formula (2) is strictly expressed, it is given as the following relational formula (2A).

$$Fg1o = \pi \times D1 \times \gamma \times \cos\theta \times \cos(\alpha/2) \quad (2A)$$

The angle α of the above-mentioned inner and outer bearing seal faces 37Bi and 37Bo is only about 20 degrees at most, and therefore the inclination of the vapor-liquid interface is only about 10 degrees. Since $\cos(\alpha/2) \approx 0.985$, ignoring the angle α of the inner and outer bearing seal faces 37Bi and 37Bo in calculations will have no effect on the relational formula (2).

Figure 5:
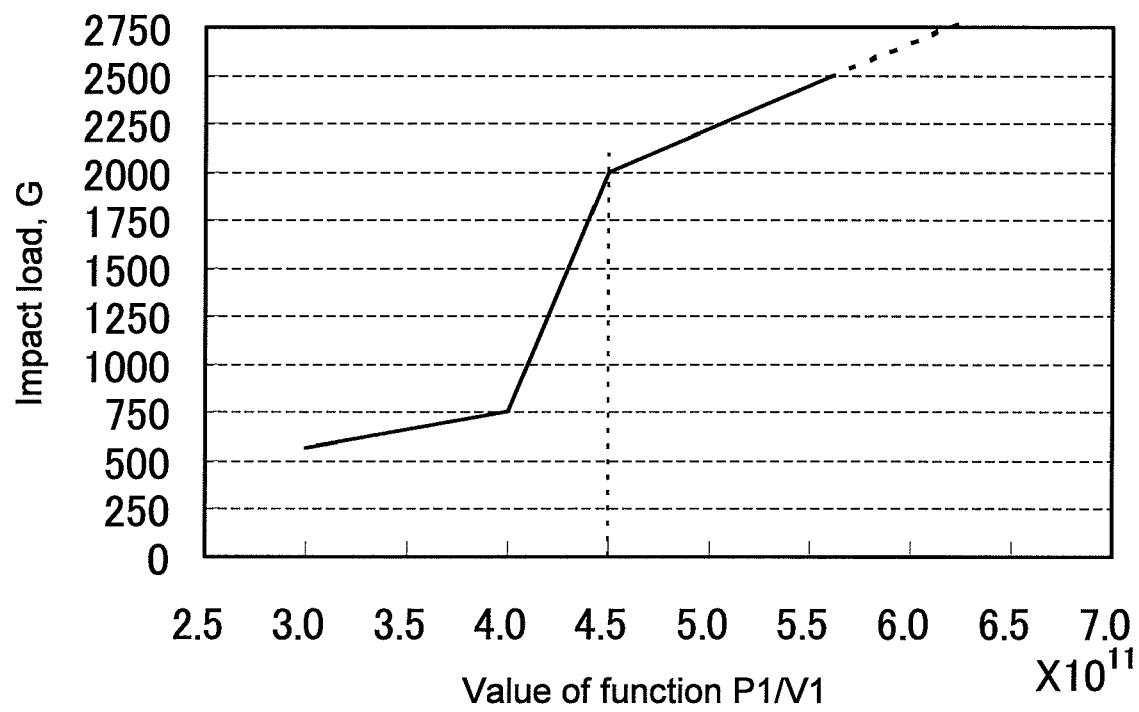
FIG. 5 is a graph of Working Example 1 of the hydrodynamic bearing device included in FIG. 1.

A test was conducted to calculate the critical value of the function P1/V1 at which the lubricant 36 would not leak out from the opened end 37A when the hydrodynamic bearing device 30 was subjected to a relatively large impact load of 2000 G. The results are shown in FIG. 5, which gives the relationship between the value of the function P1/V1 and the impact load at which the lubricant 36 leaked out from the opened end 37A in above-mentioned bearing device 30. Specifically, when the function P1/V1 is $4.0 \times 10^{11}$ or less, the impact load value at which the lubricant 36 begins to leak increases somewhat when P1/V1 is increased, but about 1000 G is the limit at $4.0 \times 10^{11}$. However, it was found that if P1/V1 is raised to at least $4.5 \times 10^{11}$, there is a sharp increase in impact resistance, and leakage of the lubricant 36 can be reliably suppressed even when the bearing device is subjected to an impact load of over 2000 G.

Consequently, even when the hydrodynamic bearing device 30 is subjected to a relatively large impact load of 2000 G, the lubricant 36 can be reliably prevented from leaking out of the opened end 37A by setting the value of the function P1/V1 to at least $4.5 \times 10^{11}$.

Furthermore, a bearing seal portion is constituted such that V2, which is the volume of the lubricant reservoir 37C in the bearing seal portion 37, and V1, which is the fluctuation volume, satisfy V1<V2.

WORKING EXAMPLE 2

With the hydrodynamic bearing device 30 installed in the spindle motor 1 of this embodiment, attention was focused on the relation (P2/V1) between the second capillary pressure index P2, which is believed to be correlated with the seal performance of the bearing seal portion 37, and the fluctuation volume V1, which is believed to be correlated with impact resistance, and the inventors concluded that if the function P2/V1 were set to be at least a specific value, a hydrodynamic bearing device 30 with superior impact resistance might be obtained.

The fluctuation volume V1 is the same as in Working Example 1 discussed above, and will therefore not be described again.

As shown in FIG. 4, the second capillary pressure index P2 refers to the capillary pressure index at the vapor-liquid interface located near the interior part 37D of the bearing seal portion 37, and is expressed by a relational formula (107) derived from the following relational formulas (102) to (106).

$$Fg2o = \pi \times D2 \times \gamma \times \cos\theta \quad (102)$$

$$Fg2i = \pi \times D2i \times \gamma \times \cos\theta \quad (103)$$

$$D2i = D2 - 2 \times r2 \quad (104)$$

$$Fg2 = Fg2o + Fg2i \quad (105)$$

$$Ag2 = \pi \times (D2^2 - D2i^2)/4 \quad (106)$$

$$P2 = Fg2/Ag2 \quad (107)$$

As shown in FIG. 4, D2 is the outside diameter of the vapor-liquid interface located near the interior part 37D.

As shown in FIG. 4, r2 is the lubricant film thickness at the vapor-liquid interface located near the interior part 37D of the bearing seal portion 37.

As shown in FIG. 4, the bearing seal faces 37E that form the interior part 37D of the bearing seal portion 37 in the hydrodynamic bearing device 30 of this embodiment are such that the inner and outer bearing seal faces 37Ei and 37Eo are parallel to each other in the direction of the shaft 32.

Figure 6:
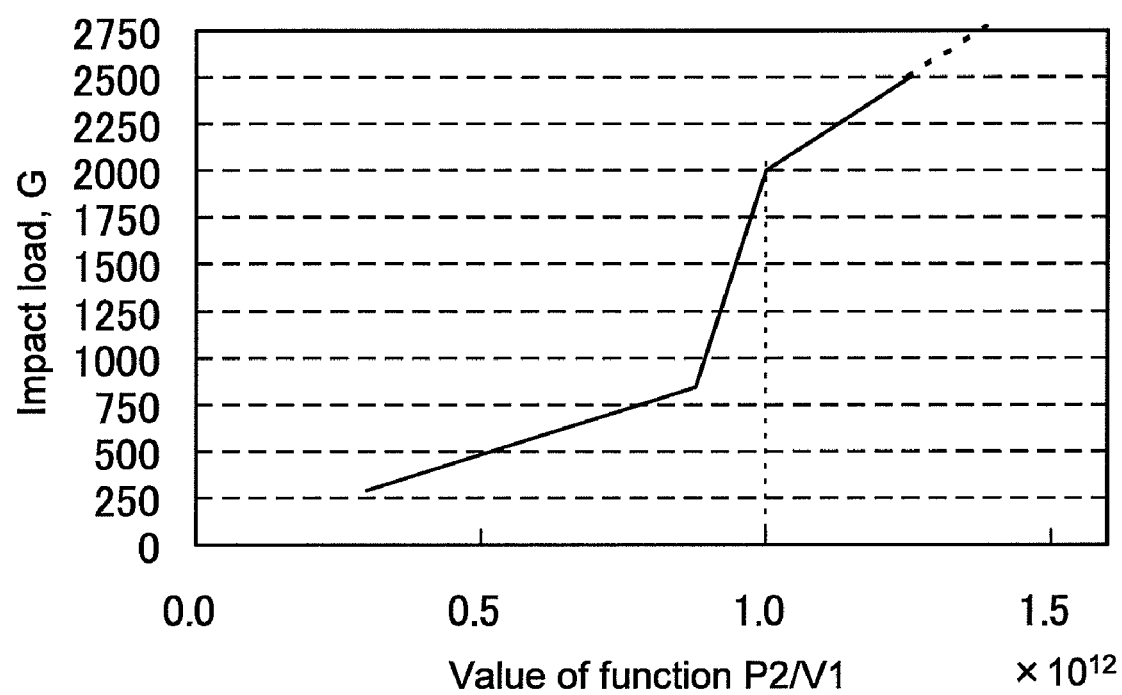
FIG. 6 is a graph of Working Example 2 of the hydrodynamic bearing device included in FIG. 1.

Here, just as in Working Example 1, a test was conducted to calculate the critical value of the function P2/V1 at which the lubricant 36 would not leak out from the opened end 37A when the hydrodynamic bearing device 30 was subjected to a relatively large impact load of 2000 G. The results are shown in FIG. 6, which gives the relationship between the value of the function P2/V1 and the impact load at which the lubricant 36 leaked out from the opened end 37A in above-mentioned bearing device 30. Specifically, when the function P2/V1 is $0.9 \times 10^{12}$ or less, the impact load value at which the lubricant 36 begins to leak increases somewhat when P2/V1 is increased, but about 1000 G is the limit at $0.9 \times 10^{12}$. However, it was found that if P2/V1 is raised to at least $1.0 \times 10^{12}$, there is a sharp increase in impact resistance, and leakage of the lubricant 36 can be reliably suppressed even when the bearing device is subjected to an impact load of over 2000 G.

Consequently, even when the hydrodynamic bearing device 30 is subjected to a relatively large impact load of 2000 G, the lubricant 36 can be more reliably prevented from leaking out of the opened end 37A by setting the value of the function P2/V1 to at least $1.0 \times 10^{12}$.

Furthermore, again in Working Example 2 a bearing seal portion is constituted such that V2, which is the volume of the lubricant reservoir 37C in the bearing seal portion 37, and V1, which is the fluctuation volume, satisfy V1<V2.

WORKING EXAMPLE 3

With the hydrodynamic bearing device 30 installed in the spindle motor 1 of this embodiment, attention was focused on the fact that the channel resistance Kr in the radial bearing portion 42 should be made sufficiently small with respect to P2, which is the capillary pressure index at the interior part 37D of the bearing seal portion 37, in order to return the lubricant to the bearing gap at the instant the impact load is released. The inventors concluded that if the function P2/Kr is set to be at least a specific value, a hydrodynamic bearing device 30 might be obtained with superior impact resistance under repeated load.

The second capillary pressure index P2 is the same as in Working Example 2 discussed above, and will therefore not be described again.

The channel resistance coefficient Kr refers to the channel resistance coefficient at the radial bearing portion 42, and is expressed by the following relational formula (207).

$$Kr = 12 \times \mu Lr \times (T \times r3 \times r3 \times r3) \quad (207)$$

Lr is the length of the radial bearing portion 42 in the axial direction. With the hydrodynamic bearing device 30 in this embodiment, the radial bearing portion 42 is formed at two places (two steps) in the direction of the shaft 32, as shown in FIG. 7, so Lr is the sum L1+L2 of the lengths of both of the radial bearing portions 42.

Figure 7:
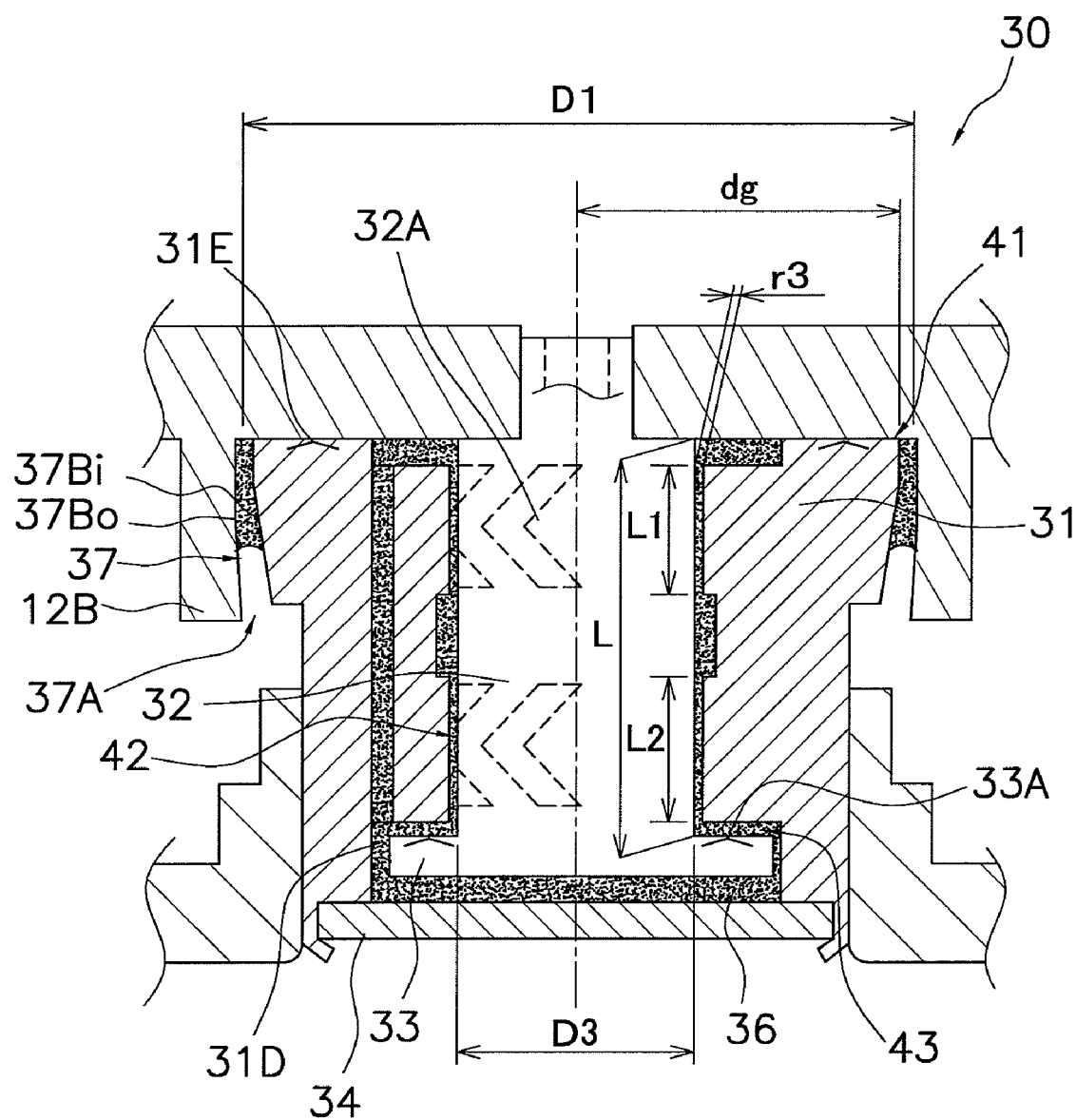
FIG. 7 is a detail diagram of the hydrodynamic bearing device included in the spindle motor of FIG. 1.

The channel width T is calculated from the following relational formula (208), and D3 is the outside diameter of the shaft 32, as shown in FIG. 7.

$$T = \pi \times D3 \quad (208)$$

Also, as shown in FIG. 7, r3 is the gap of the radial bearing portion in the radial direction of the shaft. The term "gap" here ignores the depth of the hydrodynamic grooves 32A formed in the radial bearing portion 42.

Figure 8:
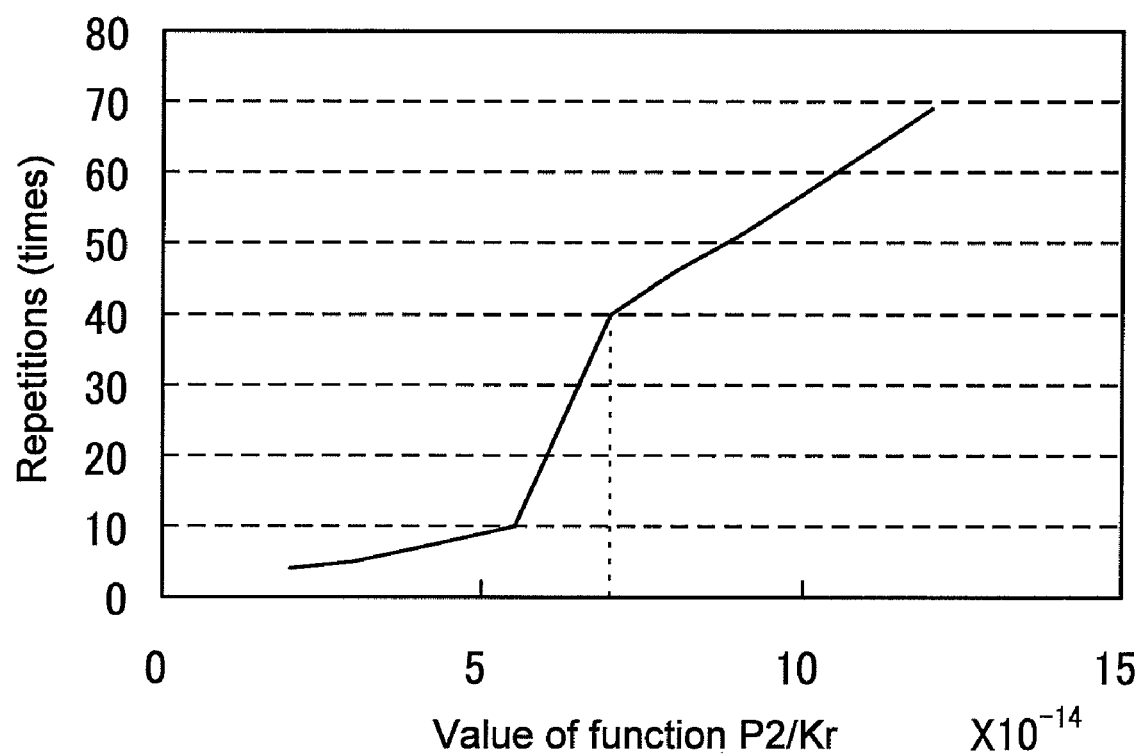
FIG. 8 is a graph of Working Example 3 of the hydrodynamic bearing device included in FIG. 1.

A test was conducted to calculate the critical value of the function P2/Kr at which the lubricant 36 would not leak out from the opened end 37A when the hydrodynamic bearing device 30 was subjected to a repeated impact load of 2000 G 40 times. The results are shown in FIG. 8, which gives the relationship between the value of the function P2/Kr and the number of times of impact load when the lubricant 36 leaked out from the opened end 37A. Specifically, when the function P2/Kr is $6.0 \times 10^{-14}$ or less, the lubricant 36 begins to leak out from the opened end 37A when a repeated impact load (2000 G) is applied about 10 times to the hydrodynamic bearing device 30, but it was found that if the function P2/Kr is increased to at least $7.0 \times 10^{-14}$, there is a sharp increase in repeated impact resistance, and leakage of the lubricant 36 can be reliably suppressed even when the bearing device is subjected 40 or more times to an impact load of 2000 G.

Consequently, even under relatively harsh conditions where the hydrodynamic bearing device 30 is subjected to an impact load of 2000 G 40 or more times, the lubricant 36 can be more reliably prevented from leaking out of the opened end 37A by setting the value of the function P2/Kr to be at least $7.0 \times 10^{-4}$.

WORKING EXAMPLE 4

With the hydrodynamic bearing device 30 installed in the spindle motor 1 of this embodiment, it is surmised that any bubbles that work their way into the radial bearing portion 42 will be more likely to be discharged outside of the radial bearing portion 42 if the opening surface area is greater, and that the longer is the bearing portion, the less the bubbles will diminish performance. It was concluded that if the value of the function (P1/V1)×D1×D1×L were set to be at least a specific value, the decrease in performance caused by bubbles in the radial bearing portion 42 might be suppressed.

The function (P1/V1)×D×D1×L includes D1×D1, which is the correlation with the opening surface area at the opened end 37A of the bearing seal portion 37, and L, which is the length of the radial bearing portion 42.

As shown in FIG. 7, D1 is the outside diameter of the vapor-liquid interface located near the opened end 37A of the bearing seal portion 37.

As shown in FIG. 7, L is the length of the radial bearing portion 42 in the direction of the shaft 32 at the portion filled with the lubricant 36 (distinguished from the length of the radial hydrodynamic grooves 32A in the direction of the shaft 32).

Figure 9:
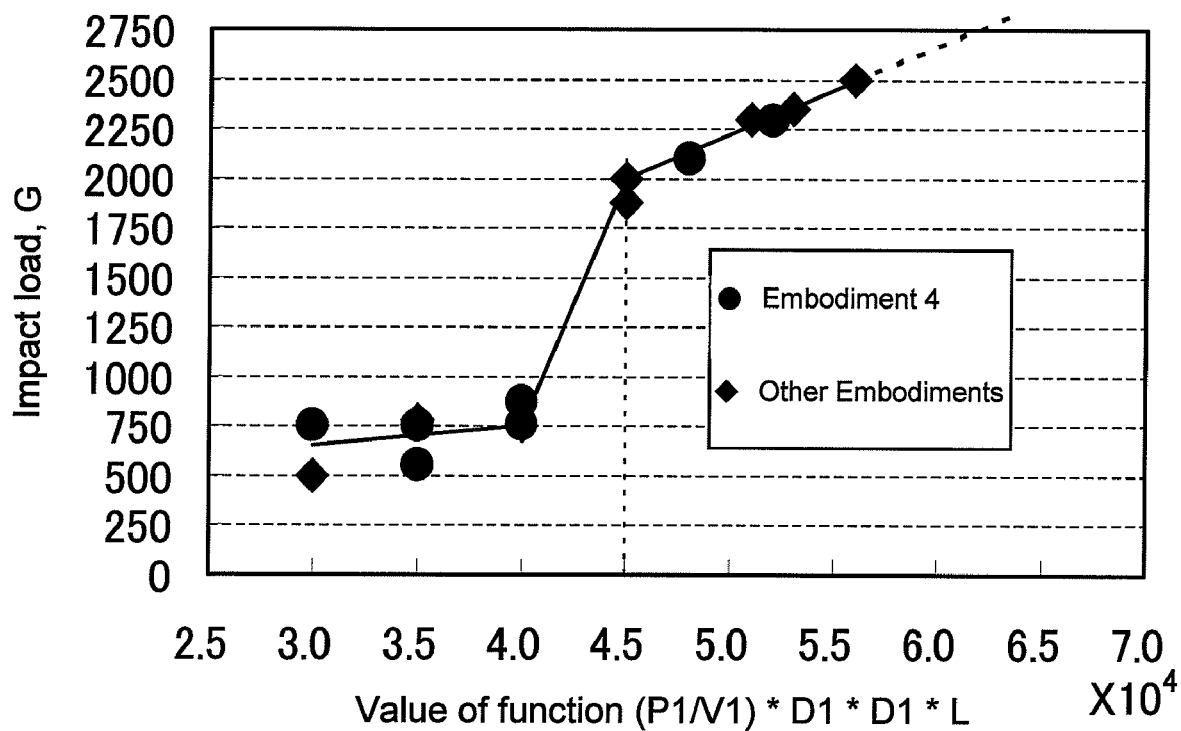
FIG. 9 is a graph of Working Example 4 of the hydrodynamic bearing device included in FIG. 1.

Here, just as in Working Example 1, a test was conducted to calculate the critical value of the function (P1/V1)×D1×D1×L at which the lubricant 36 would not leak out from the opened end 37A when the hydrodynamic bearing device 30 was subjected to an impact load of 2000 G. The results are shown in FIG. 9, in which the solid black circles indicate the relationship between the value of the function (P1/V1)×D1×D1×L and the impact load at which the lubricant 36 leaked out from the opened end 37A. Specifically, when the function (P1/V1)×D1×D1 ×L was 40,000 or less, the condition for the lubricant 36 not leaking out from the opened end 37A was that the impact load to which the hydrodynamic bearing device 30 was subjected be 1000 G or less, but it was found that if the function (P1/V1)×D1×D1×L was set to be at least 45,000, there was a sharp increase in impact resistance, and leakage of the lubricant 36 could be reliably prevented even at an impact load of over 2000 G.

Table 1 shows specific design examples for the hydrodynamic bearing device 30 shown in FIG. 2. With the design values in both cases, the value of the function (P1/V1)×D1×D1×L was at least 45,000, and impact resistance of over 2000 G could be obtained.

TABLE 1

| Structure | Unit | FIG. 2 | FIG. 2 |
|---|---|---|---|
| G: thrust play | m | 0.0000200 | 0.0000300 |
| dg: inside diameter of vertically vibrating portion | m | 0.0060000 | 0.0060000 |
| γ: surface tension of lubricant | N/m | 0.0288 | 0.0288 |
| θ: contact angle of lubricant | rad | 0.2269 | 0.2269 |
| D1: outside diameter of lubricant reservoir opening cylinder | m | 0.006000 | 0.006000 |
| r1: lubricant film thickness at opening cylinder | m | 0.000120 | 0.000120 |
| ratio (P1/V1) | Pa/m$^3$ | $8.27489 \times 10^{11}$ | $5.51659 \times 10^{11}$ |
| L: length of radial bearing portion in axial direction | m | 0.003 | 0.003 |
| r3: radial bearing gap (ignoring groove depth) | m | 0.0000020 | 0.0000020 |
| function (P1/V1) × D1 × D1 × L | Pa | 89368.8 | 59579.2 |
| function (P1/V1) × D1 × D1 × r3 × L | Pa·m | 0.17874 | 0.11916 |

Consequently, even when the hydrodynamic bearing device 30 is subjected to a relatively large impact load of 2000 G, the lubricant 36 can be reliably prevented from leaking out of the opened end 37A by setting the value of (P1/V1)×D1×D1×L to at least 45,000.

WORKING EXAMPLE 5

With the hydrodynamic bearing device 30 installed in the spindle motor 1 of this embodiment, it is surmised that any bubbles that work their way into the radial bearing portion 42 will be more likely to be discharged outside of the radial bearing portion 42 if the opening surface area is greater, and that the greater is the volume of the radial bearing portion 42, the less the bubbles will diminish performance. It was concluded that if the function (P1/V1)×D1×D1×r3×L were set to be at least a specific value, the decrease in performance caused by bubbles in the radial bearing portion 42 might be minimized.

The function (P1/V1)×D1×D1×r3×L includes D1×D1, which is the correlation with the opening surface area at the opened end 37A of the bearing seal portion 37, and r3×L, which is the correlation with the volume of the radial bearing seal portion 37.

As shown in FIG. 7, D1 is the outside diameter of the vapor-liquid interface located near the opened end 37A of the bearing seal portion 37.

As shown in FIG. 7, r3 is the gap of the radial bearing portion 42 in the radial direction of the shaft 32. The term "gap" here ignores the depth of the hydrodynamic grooves 32A formed in the radial bearing portion 42.

As shown in FIG. 7, L is the length of the radial bearing portion 42 in the direction of the shaft 32 at the portion filled with the lubricant 36 (distinguished from the length of the radial hydrodynamic grooves 32A in the direction of the shaft 32).

Figure 10:
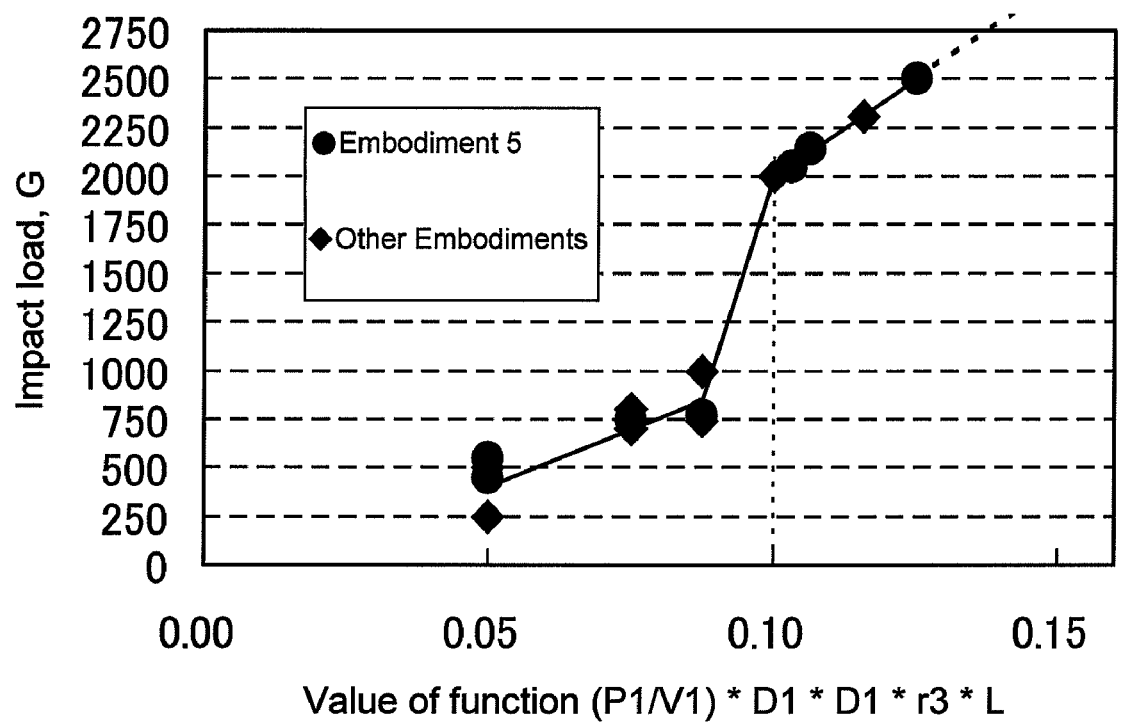
FIG. 10 is a graph of Working Example 5 of the hydrodynamic bearing device included in FIG. 1.

Here, just as in Working Example 1, a test was conducted to calculate the critical value of the function (P1/V1)×D1×D1×r3×L at which the lubricant 36 would not leak out from the opened end 37A when the hydrodynamic bearing device 30 was subjected to an impact load of 2000 G. The results are shown in FIG. 10, in which the solid black circles indicate the relationship between the value of the function (P1/V1)×D1×D1×r3×L and the impact load at which the lubricant 36 leaked out from the opened end 37A. Specifically, when the function (P1/V1)×D1×D1×r3×L is 0.09 or less, the condition for the lubricant 36 not leaking out from the opened end 37A is that the impact load to which the hydrodynamic bearing device 30 is subjected be 1000 G or less, but it was found that if the function (P1/V1)×D1×D1×r3×L is set to be at least 0.1, there is a sharp increase in impact resistance, and leakage of the lubricant 36 can be reliably prevented even at an impact load of over 2000 G.

Table 1 shows two specific design examples for the hydrodynamic bearing device 30 shown in FIG. 2. With the design values in both cases, the value of the function (P1/V1)×D1×D1×r3×L was at least 0.1, and impact resistance of over 2000 G could be obtained.

Consequently, even when the hydrodynamic bearing device 30 is subjected to a relatively large impact load of 2000 G, the lubricant 36 can be reliably prevented from leaking out of the opened end 37A by setting the value of (P1/V1)×D1×D1×r3×L to at least 0.1.

WORKING EXAMPLE 6

With the above-mentioned hydrodynamic bearing device 30, the lubricant 36 does not leak out from the opened end 37A even when the bearing device is subjected to an impact load by satisfying the conditions of above-mentioned Working Example 1. Therefore, no lubricant film breakdown occurs in the bearing gap between the bearing portions 41, 42, and 43, rotation performance is good, and reliability is high, but furthermore, since the lubricant 36 is favorably supported in the above-mentioned bearing gap, no gas called oil mist is generated. This makes it possible to increase recording and reproduction reliability in an information apparatus in which the above-mentioned hydrodynamic bearing device 30 is installed.

Figure 11:
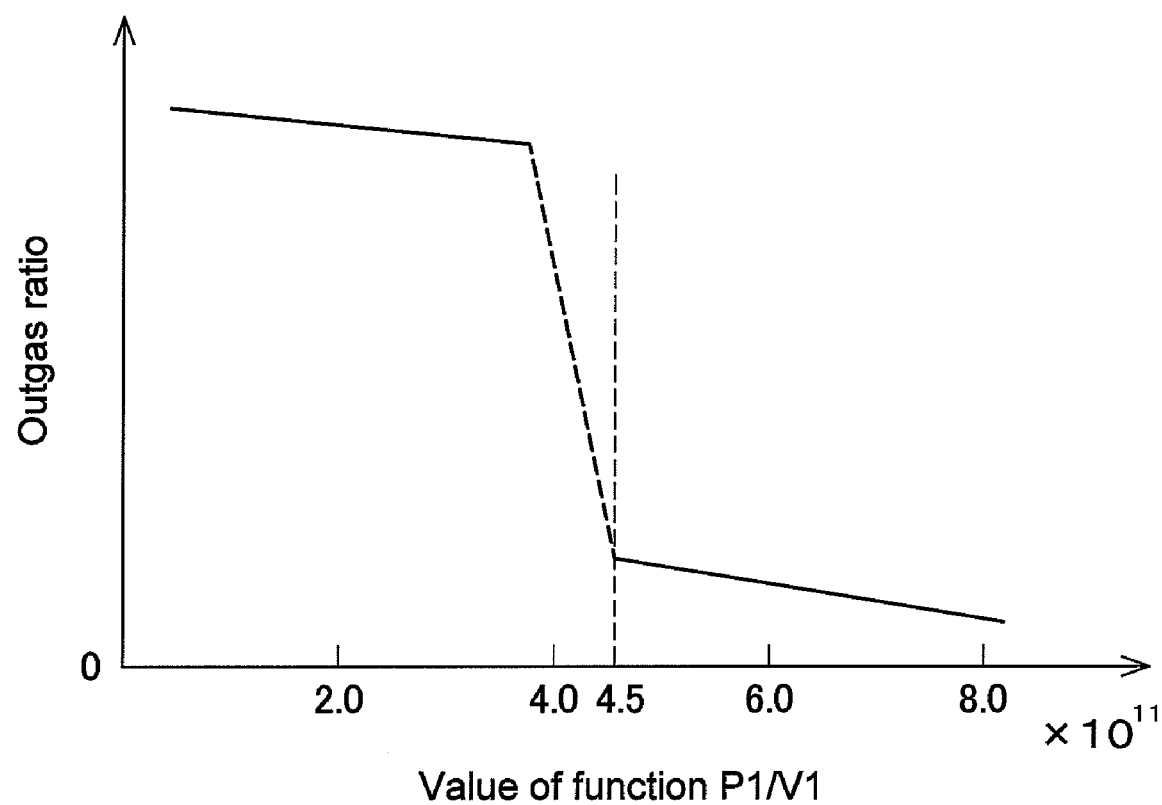
FIG. 11 is a graph of Working Example 6 of the hydrodynamic bearing device included in FIG. 1.

Here, a test was conducted to examine the relationship between the value of the function P1/V1 given in Working Example 2 above and the outgas ratio. As a result, as shown in FIG. 11, it was learned that if the value of the function P1/V1 is at least $4.5 \times 10^{11}$, the outgas ratio (that is, the generation of oil mist) will drop sharply. Consequently, the inside of an information apparatus in which the above-mentioned hydrodynamic bearing device 30 is installed can be kept extremely clean by setting the value of the function P1/V1 to at least $4.5 \times 10^{11}$ in this information apparatus, which means that this is extremely favorable for information apparatuses that make use of optical recording or magnetic heads.

Other Embodiments

Embodiments of the present invention were described above, but the present invention is not limited to or by these embodiments, and various modifications are possible without departing from the gist of the invention.

(A)

With the spindle motor 1 in the above embodiment, an example was given of applying Working Examples 1 to 6 to a type of spindle motor such as that shown in FIG. 1, in which the bearing seal portion 37 was formed by the outer peripheral surface of the sleeve 31 and the inner peripheral surface of the cylindrical wall portion 12B included in the hub 12, but the present invention is not limited to this.

Figure 12:
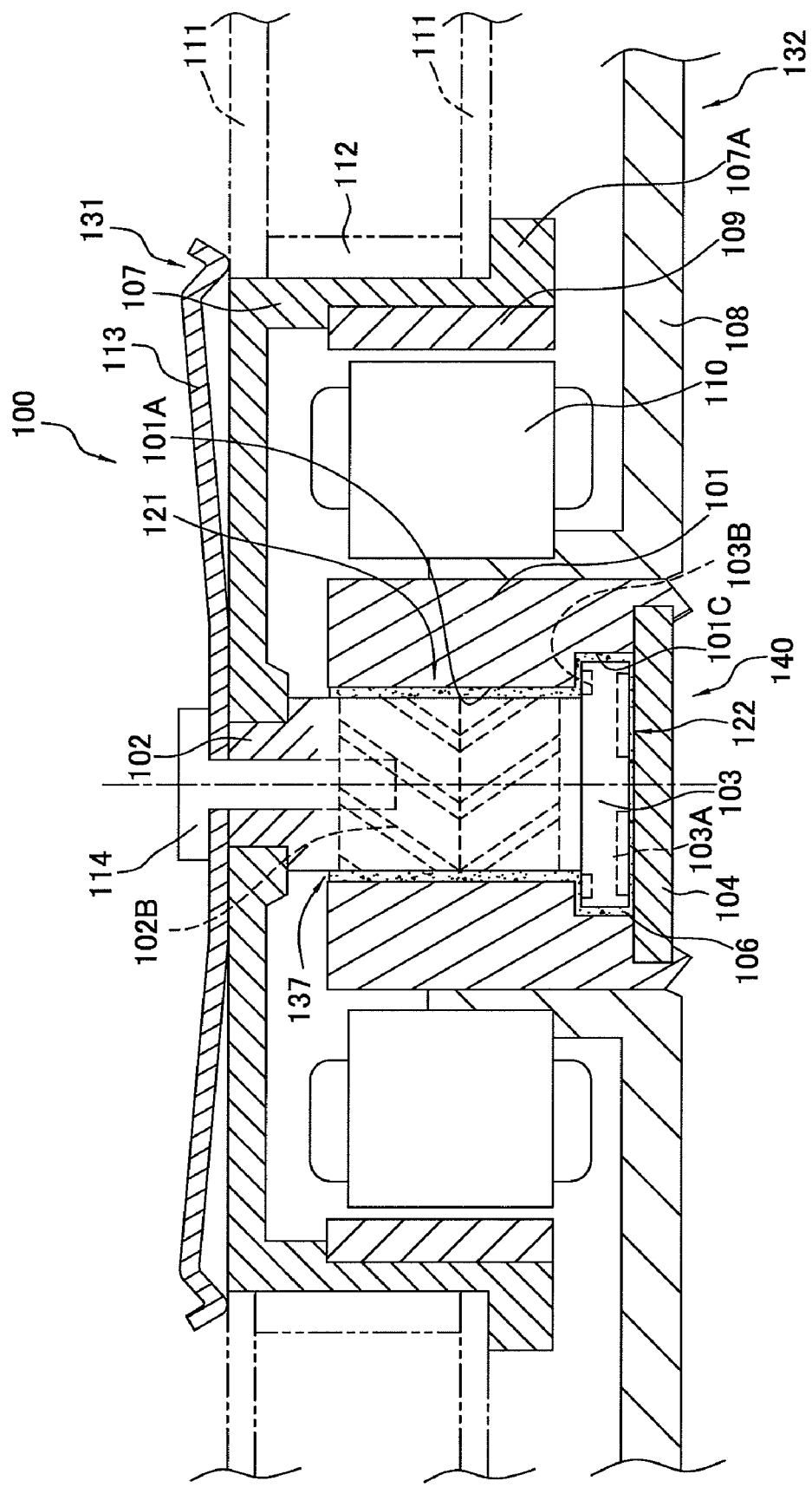
FIG. 12 is a simplified vertical cross section of a spindle motor that includes the hydrodynamic bearing device according to another embodiment of the present invention.

For instance, Working Examples 1 to 5 can also be applied to the spindle motor 100 in which a hydrodynamic bearing device 140 is installed as shown in FIG. 12, in which a bearing seal portion 137 is formed by the outer peripheral surface of a shaft 102 and the inner peripheral surface of a sleeve 101. The spindle motor 100 will now be described.

The spindle motor 100 is an apparatus for rotationally driving a recording disk 111, and as shown in FIG. 12, it mainly comprises a rotating member 131, a stationary member 132, and a hydrodynamic bearing device 140.

The rotating member 131 mainly comprises a hub 107 on which the recording disk 111 is mounted, and a rotor magnet 109 that constitutes a magnetic circuit along with a stator 110 (discussed below). A disk placement portion 107A is formed integrally around the outer peripheral part of the hub 107 in the downward axial direction. Two of the recording disks 111 are fitted via an annular spacer 112 on the outer peripheral side of the hub 107, and placed over the disk placement portion 107A. A damper 113 is fixed with a screw 114 in the upward axial direction of the shaft 102, and the hub 107 is fixed by press fitting and/or adhesive bonding to the shaft 102, or the two members are formed integrally. The recording disks 111 are pressed in the downward axial direction by the damper 113, and clamped between the damper 113 and the disk mounting portion 107A. The rotor magnet 109 is fixed to the inner peripheral side of the hub 12.

The stationary member 132 is fixed to a housing of a recording disk drive apparatus (not shown), and is constituted mainly by a base 108 and the stator 110 that is fixed to the base 108. The stator 110 is disposed opposite the inner peripheral side of the rotor magnet 109 in the radial direction. The hydrodynamic bearing device 140 is fixed to the middle part of the base 108. The hydrodynamic bearing device 140 supports the rotating member 131 so as to be capable of rotating with respect to the stationary member 132.

Figure 13:
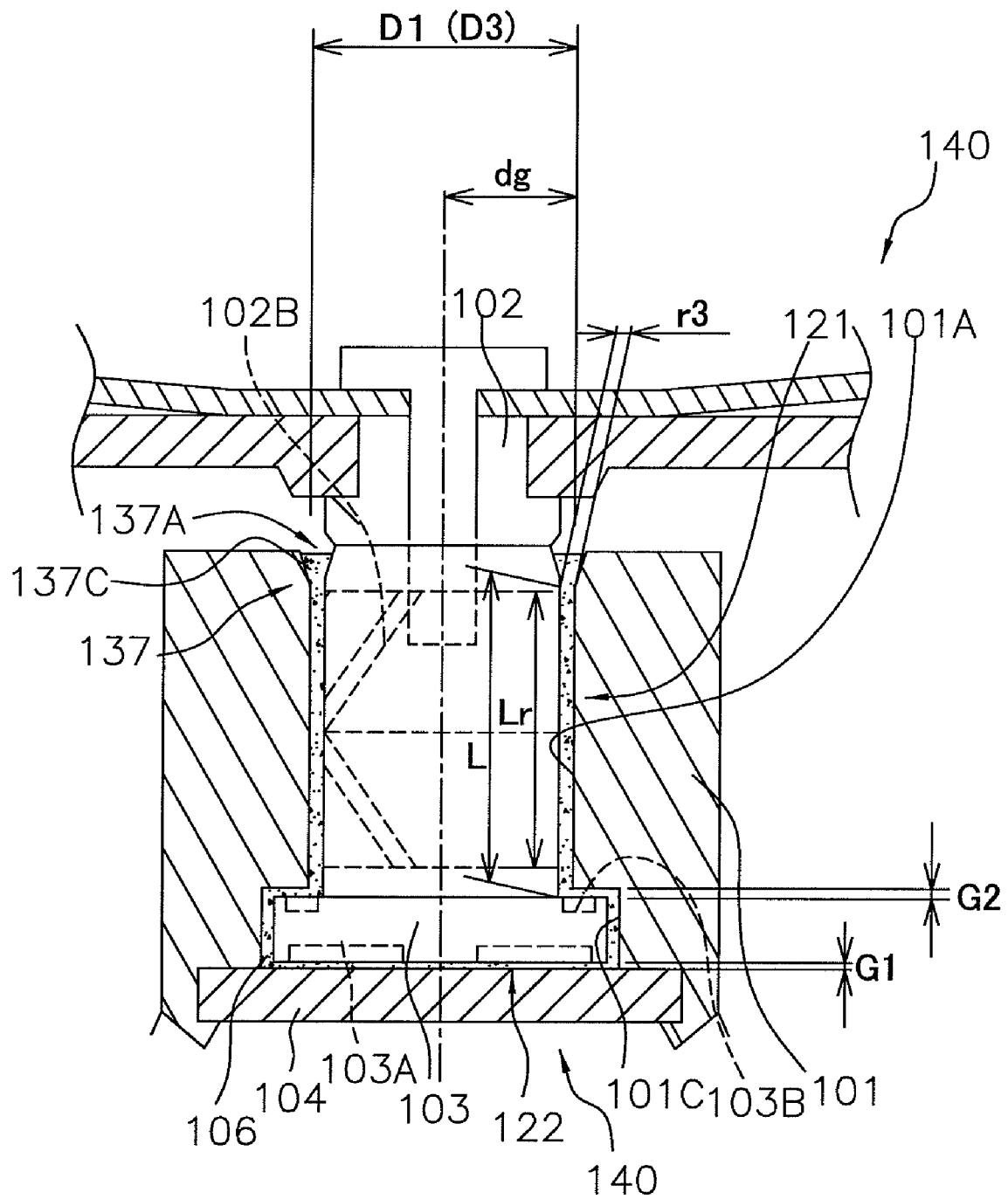
FIG. 13 is a detail diagram of the hydrodynamic bearing device included in the spindle motor of FIG. 12.

As shown in FIG. 13, the hydrodynamic bearing device 140 mainly comprises the sleeve 101, the shaft 102, a flange 103, a thrust plate 104, and a lubricant 106. The sleeve 101 and the thrust plate 104 constitute the stationary member, and the shaft 102 and the flange 103 constitute the rotary member.

The sleeve 101 is a cylindrical member that extends in the axial direction, and is fixed to the base 108 by adhesive bonding or the like. The thrust plate 104 is fixed to the end of the sleeve 101 in the downward axial direction, and a bearing hole 101A is formed by the sleeve 101 and the thrust plate 104.

The shaft 102 is a cylindrical member that extends in the axial direction, and rotatably supports the hub 107. More specifically, the shaft 102 is disposed so as to be capable of relative rotation via a gap on the inner peripheral side of the sleeve 101, and the hub 107 is fixed to the end of the shaft 102 in the upward axial direction. A plurality of radial hydrodynamic grooves 102B are formed on the outer peripheral surface of the shaft 102, and a radial bearing portion 121 having the radial hydrodynamic grooves 102B is formed between the sleeve 101 and the shaft 102. The radial hydrodynamic grooves 102B have a herringbone pattern that is asymmetric in the axial direction, for example. The shaft 102 and the rotating member 131 are supported in the radial direction by support pressure generated by the radial bearing portion 121.

The flange 103 is a disk-shaped member, and is fixed to the end of the shaft 102 in the downward axial direction. A plurality of thrust hydrodynamic grooves 103A and 103B are formed on the faces of the flange 103 in the upward axial direction and the downward axial direction, and a thrust bearing portion 122 having the thrust hydrodynamic grooves 103A and 103B is formed between the flange 103 and the sleeve 101, flange 103 and the thrust plate 104. The thrust hydrodynamic grooves 103A and 103B have a spiral pattern, for example. The shaft 102 and the rotating member 131 are supported in the axial direction by support pressure generated by the thrust bearing portion 122. The shaft 102 and the flange 103 may also be formed integrally. Also, the thrust hydrodynamic grooves 103A and 103B may have a herringbone pattern instead.

An annular recess 101C is formed at the end of the sleeve 101 in the downward axial direction, and the outer peripheral part of the flange 103 is housed between the recess 101C and the thrust plate 104.

The radial bearing portion 121 and the thrust bearing portion 122 are filled with a lubricant 106. Examples of the lubricant 106 include low-viscosity ester oils. The sleeve 101 is made from pure iron, stainless steel, a copper alloy, a sintered metal, or the like. The shaft 102 is made from stainless steel or the like.

Figure 14A:
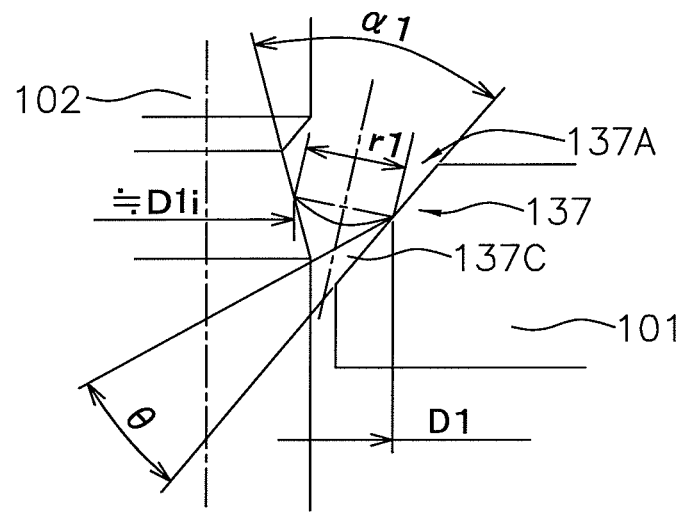
FIGS. 14A and 14B are detail diagrams of the bearing seal portion included in the hydrodynamic bearing device of FIG. 13.
Figure 14B:
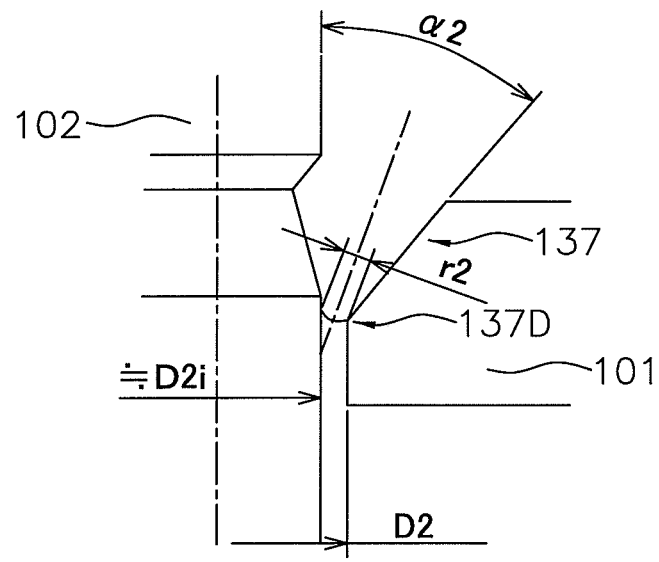

The parameters when Working Examples 1 to 5 are applied to the spindle motor 100 in which the hydrodynamic bearing device 140 is installed are shown in FIGS. 13, 14A, and 14B.

Figure 15:
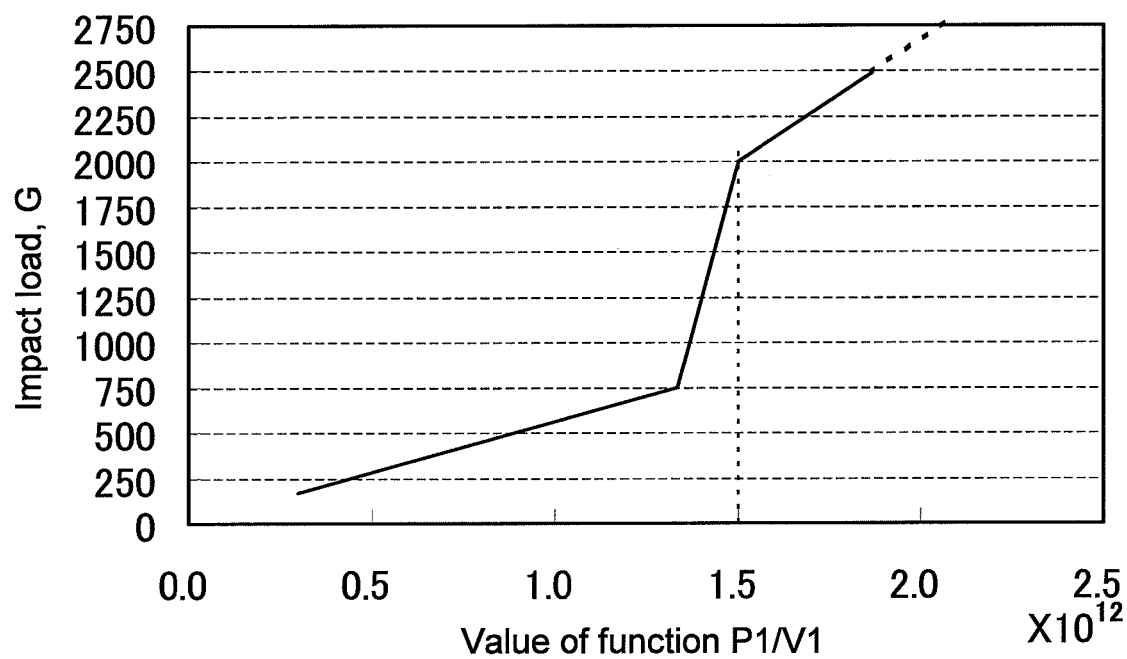
FIG. 15 is a graph of Working Example 1 of the hydrodynamic bearing device included in FIG. 13.

The same test as in Working Example 1 was conducted for the hydrodynamic bearing device 140. FIG. 15 shows the relationship between the value of the function P1/V1 and the impact load at which the lubricant 106 leaked out from the opened end 137A with the hydrodynamic bearing device 140. Specifically, when the function P1/V1 is $1.4 \times 10^{12}$ or less, the impact load value at which the lubricant 106 begins to leak increases somewhat when P1/V1 is increased, but about 1000 G is the limit at $1.4 \times 10^{12}$. However, it was found that if P1/V1 is raised to at least $1.5 \times 10^{12}$, there is a sharp increase in impact resistance, and leakage of the lubricant 106 can be reliably suppressed even when the bearing device is subjected to an impact load of over 2000 G.

Consequently, even when the hydrodynamic bearing device 140 is subjected to a relatively large impact load of 2000 G, the lubricant 106 can be more reliably prevented from leaking out of the opened end 137A by setting the value of the function P1/V1 to at least $1.5 \times 10^{12}$.

Furthermore, again with the hydrodynamic bearing device 140, a bearing seal portion is constituted such that V2, which is the volume of the lubricant reservoir 137C in the bearing seal portion 137, and V1, which is the fluctuation volume, satisfy V1<V2.

Figure 16:
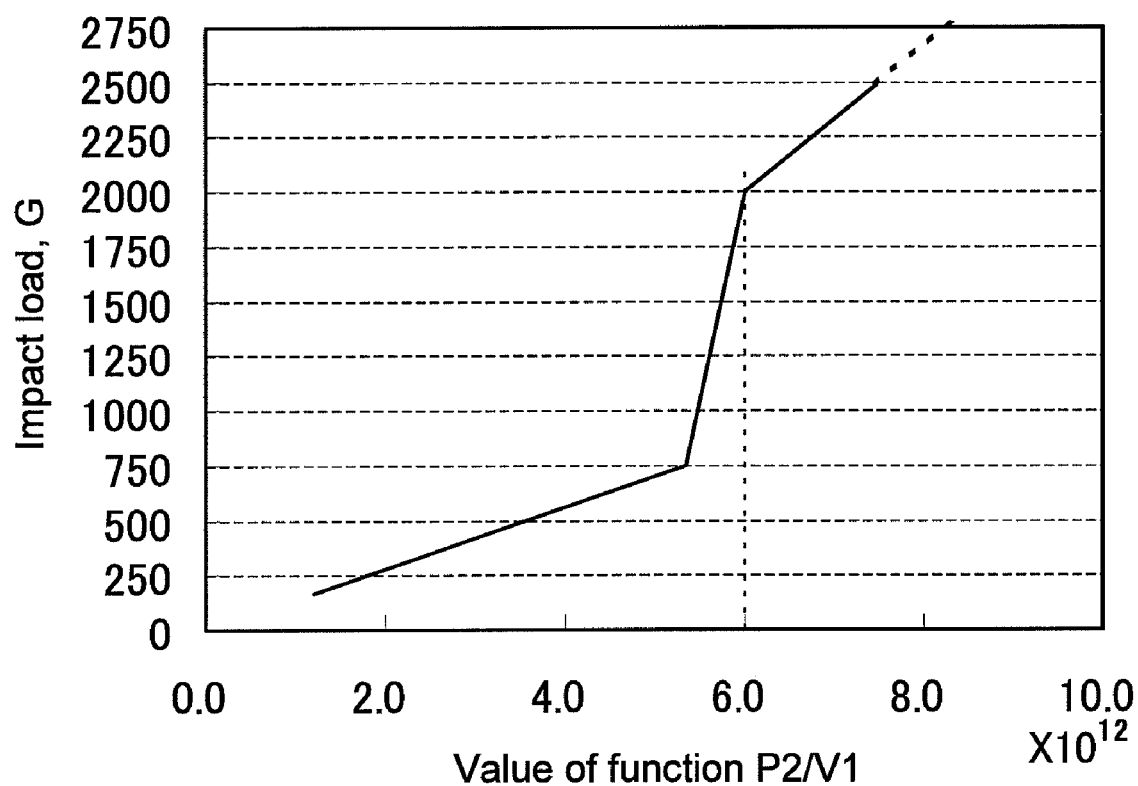
FIG. 16 is a graph of Working Example 2 of the hydrodynamic bearing device included in FIG. 13.

The same test as in Working Example 2 was conducted on the hydrodynamic bearing device 140. FIG. 16 shows the relationship between the value of the function P2/V1 and the impact load at which the lubricant 106 leaked out from the opened end 137A with the hydrodynamic bearing device 140. Specifically, when the function P2/V1 is $5.5 \times 10^{12}$ or less, the impact load value at which the lubricant 106 begins to leak increases somewhat when P2/V1 is increased, but about 1000 G is the limit at $5.5 \times 10^{12}$. However, it was found that if P2/V1 is raised to at least $6.0 \times 10^{12}$, there is a sharp increase in impact resistance, and leakage of the lubricant 106 can be reliably suppressed even when the bearing device is subjected to an impact load of over 2000 G.

Consequently, even when the hydrodynamic bearing device 140 is subjected to a relatively large impact load of 2000 G, the lubricant 106 can be more reliably prevented from leaking out of the opened end 137A by setting the value of the function P2/V1 to at least $6.0 \times 10^{12}$.

Figure 17:
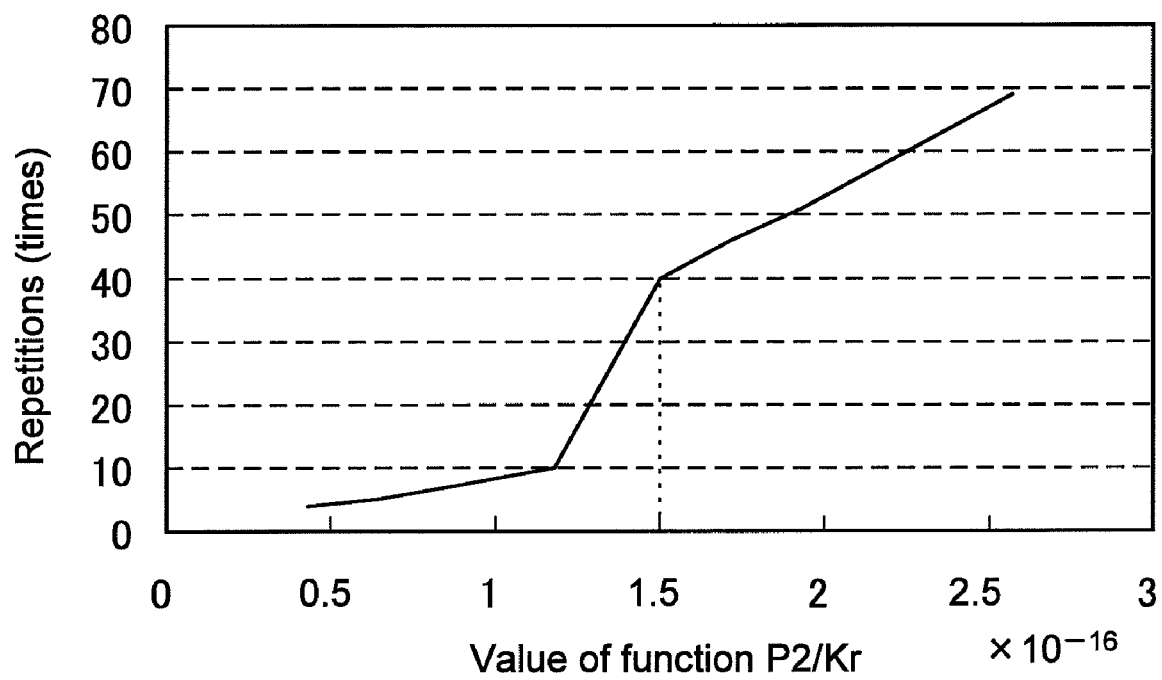
FIG. 17 is a graph of Working Example 3 of the hydrodynamic bearing device included in FIG. 13.

Also, the same test as in Working Example 3 was conducted on the hydrodynamic bearing device 140. FIG. 17 shows the relationship between the value of the function P2/Kr and repetition of the impact load at which the lubricant 106 leaked out from the opened end 137A with the hydrodynamic bearing device 140. Specifically, when the function P2/Kr is $1.3 \times 10^{-16}$ or less, the lubricant 106 begins to leak out from the opened end 137A when a repeated impact load (2000 G) is applied about 10 times to the hydrodynamic bearing device 140, but it was found that if the function P2/Kr is increased to at least $1.5 \times 10^{-16}$, there is a sharp increase in repeated impact resistance, and leakage of the lubricant 106 can be reliably suppressed even when the bearing device is subjected 40 or more times to an impact load of 2000 G.

Consequently, even under relatively harsh conditions where the hydrodynamic bearing device 140 is subjected 40 times to an impact load of 2000 G, the lubricant 106 can be more reliably prevented from leaking out of the opened end 137A by setting the value of the function P2/Kr to be at least $1.5 \times 10^{-16}$.

Also, the same test as in Working Example 4 was conducted on the hydrodynamic bearing device 140. FIG. 9 shows the results, in which the black diamonds indicate the relationship between the value of the function (P1/V1)×D1×D1×L and the impact load at which the lubricant 106 leaked out from the opened end 137A with the hydrodynamic bearing device 140. Specifically, when the function (P1/V1)×D1×D1×L is 40,000 or less, the condition for the lubricant 106 not to leak out from the opened end 137A is that the impact load to which the hydrodynamic bearing device 140 is subjected be 1000 G or less, but it was found that if the function (P1/V1)×D1×D1×L is increased to at least 45,000, there is a sharp increase in impact resistance, and leakage of the lubricant 106 can be reliably suppressed even when the bearing device is subjected to an impact load of more than 2000 G.

Figure 18:
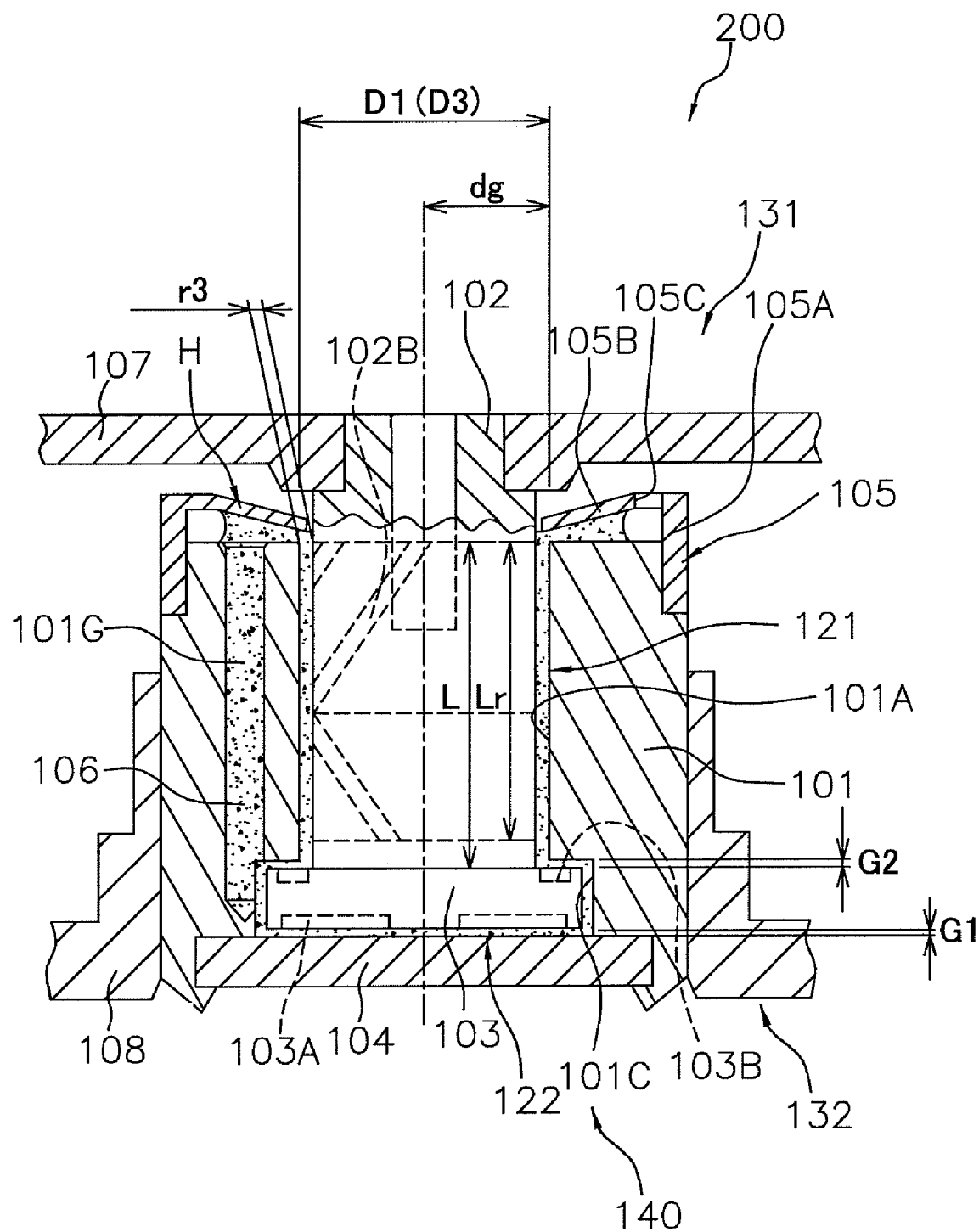
FIG. 18 is a simplified vertical cross section of the hydrodynamic bearing device according to another embodiment of the present invention.

Table 2 shows specific design examples for the hydrodynamic bearing devices 140 and 200 shown in FIGS. 13 and 18. With the design values in both cases, the value of the function (P1/V1)×D1×D1×L was at least 45,000, and impact resistance of over 2000 G could be obtained.

leaked out from the opened end 137A with the hydrodynamic bearing device 140. Specifically, when the function (P1/V1)×D1×D1×r3×L is 0.09 or less, the condition for the lubricant 106 not leaking out from the opened end 137A is that the impact load to which the hydrodynamic bearing device 140 is subjected be 1000 G or less, but it was found that if the function (P1/V1)×D1×D1×r3×L is set to be at least 0.1, there is a sharp increase in impact resistance, and leakage of the lubricant 106 can be reliably prevented even at an impact load of over 2000 G.

Table 2 shows two specific design examples for the hydrodynamic bearing devices 140 and 200 shown in FIGS. 13 and 18. With the design values in both cases, the value of the function (P1/V1)×D1×D1×r3×L was at least 0.1, and impact resistance of over 2000 G could be obtained.

Consequently, even when the hydrodynamic bearing device 140 is subjected to a relatively large impact load of 2000 G, the lubricant 106 can be reliably prevented from leaking out of the opened end 137A by setting the value of (P1/V1)×D1×D1×r3×L to at least 0.1.

As yet another embodiment, the spindle motor 100 may have the hydrodynamic bearing device 200 shown in FIG. 18.

As shown in FIG. 18, the hydrodynamic bearing device 200 has the same structure as the above-mentioned hydrodynamic bearing device 140, but further comprises a communicating hole 101G and a seal cap 105. Only the seal cap 105 and the communicating hole 101G will be described here.

The seal cap 105 is fixed to the end of the sleeve 101 in the upward axial direction. The seal cap 105 is an annular member, and has a cylindrical fixed portion 105A that is fixed to the sleeve 101, a tapered portion 105B that extends to the inside in the radial direction from the axial end of the fixed portion 105A, and a vent hole 105C formed on the outer peripheral side of the tapered portion 105B. To provide a vapor-liquid separating function, the tapered portion 105B is such that at least its inner face on the sleeve 101 side is inclined in the downward axial direction from the outside in the radial direction toward the inside. The tapered portion 105B has substantially the same inside diameter as the sleeve 101, and is disposed via a gap between itself and the outer

TABLE 2

| Structure | Unit | FIG. 13 | FIG. 18 |
| --- | --- | --- | --- |
| G: thrust play | m | 0.0000180 | 0.0000180 |
| dg: inside diameter of vertically vibrating portion | m | 0.0030000 | 0.0030000 |
| γ: surface tension of lubricant | N/m | 0.0288 | 0.0288 |
| θ: contact angle of lubricant | rad | 0.2269 | 0.2269 |
| D1: outside diameter of opened end of bearing seal portion | m | 0.003000 | 0.003000 |
| r1: lubricant film thickness at opened end of bearing seal portion | m | 0.000180 | 0.000150 |
| ratio (P1/V1) | Pa/m$^3$ | $2.45182 \times 10^{12}$ | $2.94218 \times 10^{12}$ |
| Lr: length of radial bearing portion in axial direction | m | 0.00250 | 0.00250 |
| r3: radial bearing gap (ignoring groove depth) | m | 0.0000020 | 0.0000020 |
| function (P1/V1) × D1 × D1 × L | Pa | 55165.9 | 66199.1 |
| function (P1/V1) × D1 × D1 × r3 × L | Pa · m | 0.11033 | 0.13240 |

Consequently, even when the hydrodynamic bearing device 140 is subjected to a relatively large impact load of 2000 G, the lubricant 106 can be more reliably prevented from leaking out of the opened end 137A by setting the value of (P1/V1)×D1×D1×L to at least 45,000.

Also, the same test as in Working Example 5 was conducted on the hydrodynamic bearing device 140. FIG. 10 shows the results, in which the black diamonds indicate the relationship between the value of the function (P1/V1)×D1×D1×r3×L and the impact load at which the lubricant 106 peripheral surface of the shaft 102. An annular liquid chamber H is formed between the seal cap 105 and the sleeve 101, and the inner peripheral part of the liquid chamber H communicates with the radial bearing portion 121. The size of the liquid chamber H in the axial direction decreases moving closer toward the inside the radial direction.

The communicating hole 101G circulates the lubricant 106 through the interior of the bearing portions 121 and 122, or discharges bubbles that have accumulated in the interior to outside of the bearing portions 121 and 122.

Working Examples 1 to 6 given above can also be applied to the above-mentioned hydrodynamic bearing device 200.

Figure 19:
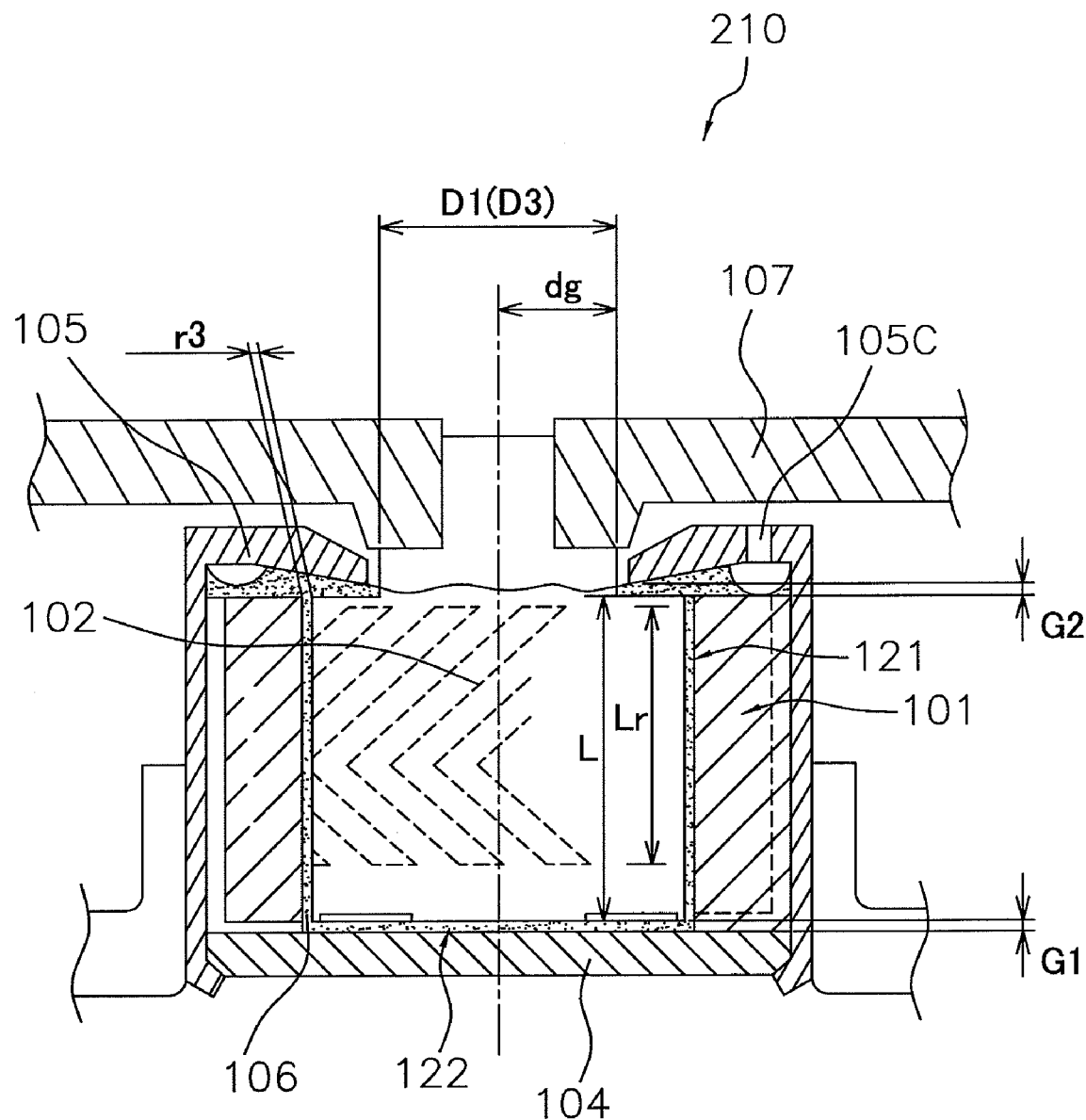
FIG. 19 is a simplified vertical cross section of the hydrodynamic bearing device according to another embodiment of the present invention.

Yet another embodiment is shown as a hydrodynamic bearing device 210 in FIG. 19, in which the seal cap 105 and the sleeve 101 of the hydrodynamic bearing device 200 are formed integrally, and which does not have a flange on the shaft 102. With the hydrodynamic bearing device 210, the thrust bearing portion 122 is formed via the lubricant 36 between the shaft 102 and the thrust plate 104. The various portions are the same as in the above-mentioned hydrodynamic bearing device 140, and will therefore not be described in detail again. The Working Examples 1 to 6 given above can also be applied to the above-mentioned hydrodynamic bearing device 210.

Figure 20:
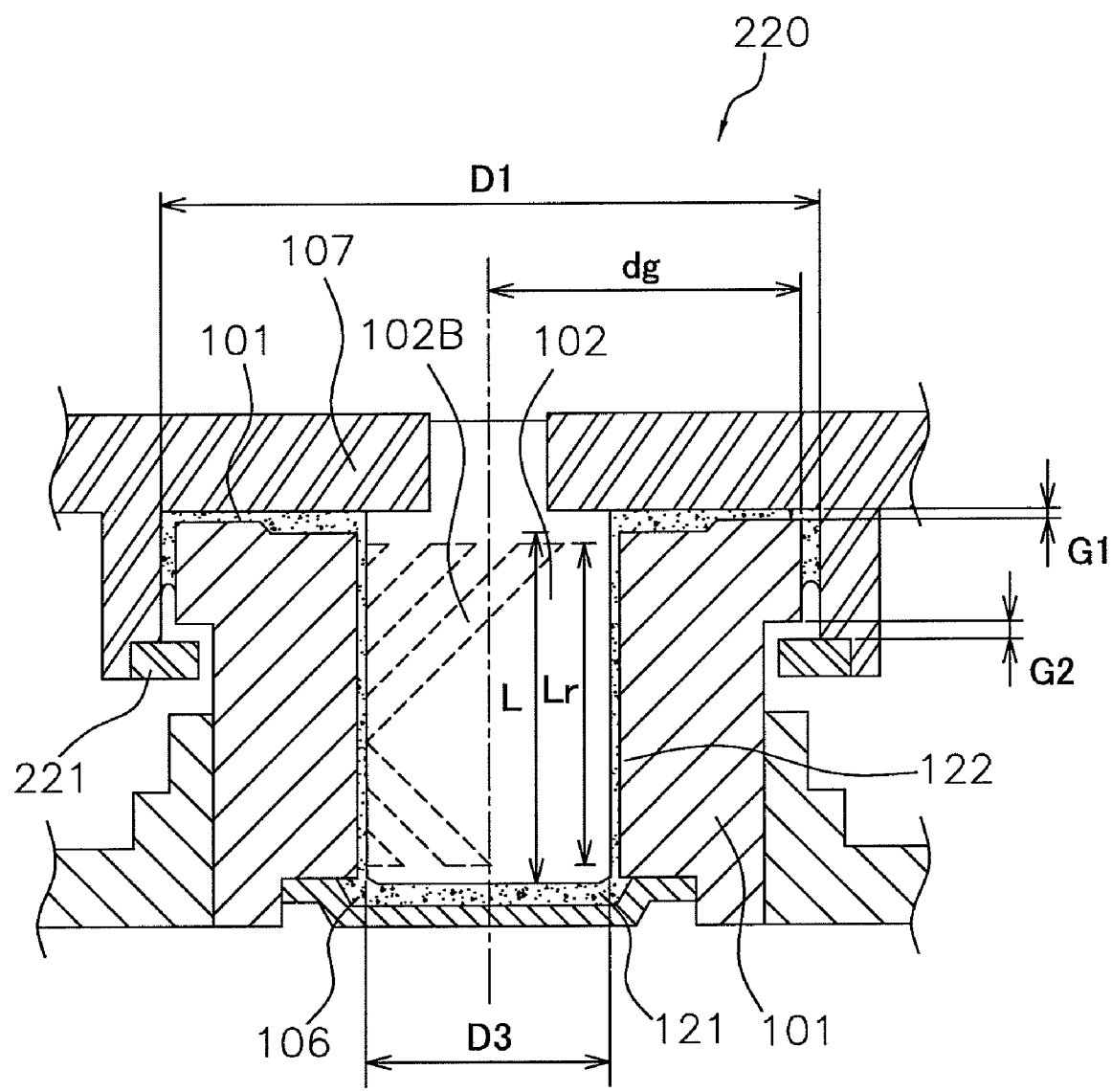
FIG. 20 is a simplified vertical cross section of the hydrodynamic bearing device according to another embodiment of the present invention.

Yet another embodiment is shown as a hydrodynamic bearing device 220 in FIG. 20, in which a retaining member 221 is formed on part of the hub 107, for example, instead of the flange 103 attached to the shaft 102. The various portions are the same as in the above-mentioned hydrodynamic bearing device 140, and will therefore not be described in detail again. The Working Examples 1 to 6 given above can also be applied to the above-mentioned hydrodynamic bearing device 220.

As discussed above, the present invention is the result of finding the optimal design ranges for P1, P2, V1, D1, r3, and so forth. These variables were optimized after analyzing and studying the fluid surface tension, capillary pressure, channel resistance, impact load, and so forth over a wide range, and then creating a number of different hypotheses as discussed above for the mechanism of the oil seal, identifying the actual phenomenon on the basis of these hypotheses, and then finding that there is a critical point in the effects of the various parameters. Therefore, the present invention represents the discovery of new design ranges not available in the past, and cannot be achieved merely by optimizing design values as extrapolations from conventional design concepts.

(B)

With the spindle motor 1 in the above embodiment, a case of applying one of Working Examples 1 to 5 was described, but the present invention is not limited to this.

For instance, the working examples given above can be combined in different ways, such as combining Working Examples 1 and 2, or combining Working Examples 1 and 3.

In particular, synergistic effects can be obtained, or certain performance aspects can be emphasized, by suitably selecting and combining from the standpoint of a working example with which static seal performance can be maintained when a specific load is applied (Working Examples 1 and 2), or of a working example with which dynamic seal performance can be maintained when a specific load is applied repeatedly (Working Example 3).

(C)

With the spindle motor 1 in the above embodiment, a case was described in which the values of the functions P1/V1 and P2/V1 were set so that the lubricant 36 would not leak out from the opened end 37A of the bearing seal portion 37 even when the bearing device was subjected to a relatively large impact load of 2000 G, but the present invention is not limited to this.

When it is necessary to meet even harsher conditions, the functions P1/V1 and P2/V1 corresponding to the assumed load may be calculated, and the hydrodynamic bearing device may be formed so as to satisfy these values.

(D)

With the spindle motor 1 in the above embodiment, a case was described in which the values of the functions P1/V1 and P2/V1 were set so that the lubricant 36 would not leak out from the opened end 37A of the bearing seal portion 37 under relatively a harsh condition of subjecting the bearing device to an impact load of 2000 G for 40 times, but the present invention is not limited to this.

When it is necessary to meet even harsher conditions, the functions P2/Kr corresponding to the assumed load and number of repetitions may be calculated, and the hydrodynamic bearing device may be formed so as to satisfy these values.

(E)

In the above embodiments, a case of applying the present invention to the spindle motor 1 was described, but the present invention is not limited to this.

Figure 21:
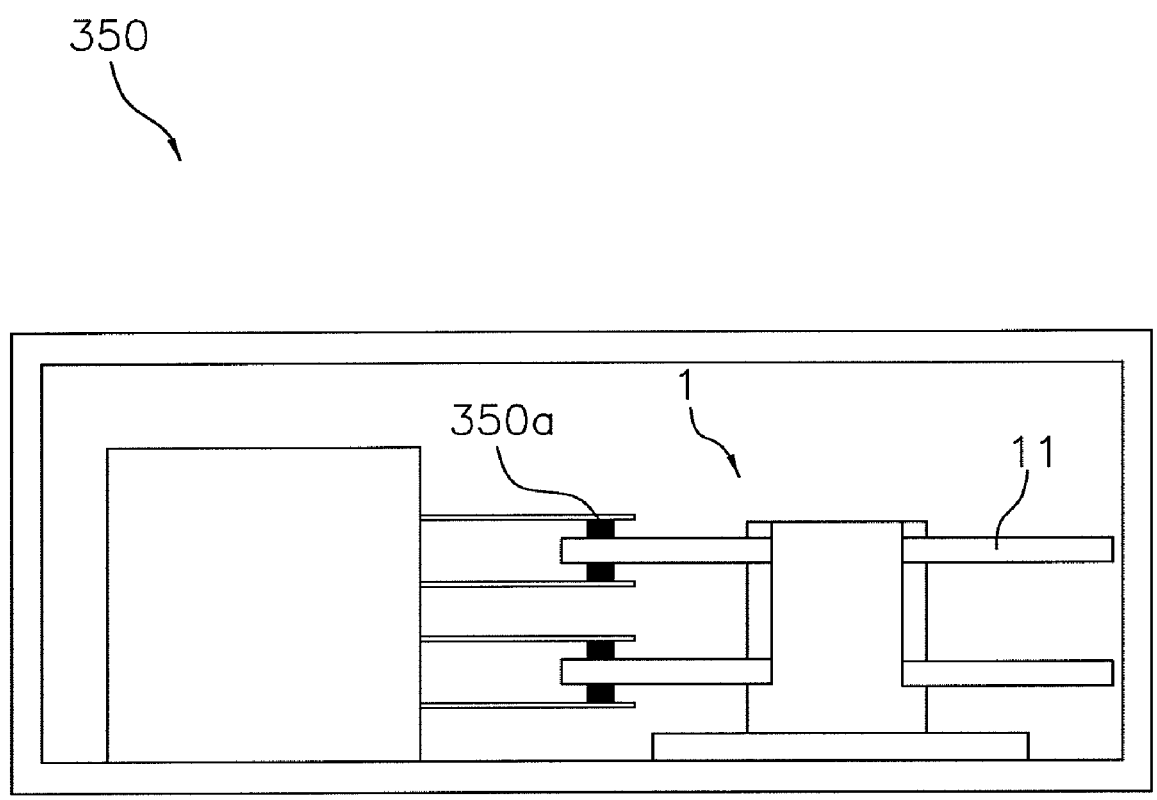
FIG. 21 is a cross section of the structure of an information apparatus including the hydrodynamic bearing device according to an embodiment of the present invention.

For example, as shown in FIG. 21, the present invention can also be applied to an information apparatus 350 in which the spindle motor 1 having the above constitution is installed, and which reproduces information recorded to the recording disk 11 with a recording head 350a, or records information to the recording disk 11.

This will prevent the lubricant 36 from leaking to the outside, and allow an information apparatus 350 to be obtained that will maintain good seal performance.

INDUSTRIAL APPLICABILITY

The present invention is useful as a drive apparatus for a hard disk apparatus or the like that needs to operate at high speed and high accuracy.

The invention claimed is:
1. A hydrodynamic bearing device, comprising:
a shaft;
a sleeve member that has a bearing hole including an open end and a closed end, and that is disposed in a state in which the shaft is inserted in the bearing hole with a microscopic gap in between, and in which the sleeve member is capable of rotation relative to the shaft;
a lubricant that fills the microscopic gap;
a bearing portion that has a radial bearing portion supporting the shaft and the sleeve member in a radial direction of the shaft via the lubricant, and a thrust bearing portion supporting the shaft and the sleeve member in an axial direction; and
a bearing seal portion that is disposed on an opened end side of the bearing portion, and suppresses leakage of the lubricant from the opened end by capillary force working between the shaft and the sleeve member,
wherein a rotor hub member formed from a substantially circular top plate and a cylindrical wall hanging down from the top plate is attached on an open end side of the shaft,
the bearing seal portion is formed by an outer peripheral surface of the sleeve member and an inner peripheral surface of the rotor hub member, and
wherein a value of a function P1/V1, where V1 implies a fluctuation volume and P1 is a first capillary pressure index, is at least $4.5 \times 10^{11}$ (Pa/m$^3$), wherein

$V1 = \pi \times dg \times dg \times G$, in which

V1 is a volume (m$^3$) by which the sleeve member is able to move in the axial direction relative to the shaft,
dg is an outermost radius (m) of the bearing portion at the open end, and G is a distance (m) by which the sleeve member is able to move in the axial direction relative to the shaft, $Fg1o = \pi \times D1 \times \gamma \times \cos\theta$, $Fg1i = \pi \times D1i \times \gamma \times \cos\theta$, $D1i = D1 - 2 \times r1$, $Fg1 = Fg1o + Fg1i$, $Ag1 = \pi \times (D1^2 - D1i^2)/4$, and $P1 = Fg1/Ag1$, in which P1 is a capillary pressure index (Pa) at a vapor-liquid interface located near the opened end of the bearing seal portion, γ is a surface tension (N/m) of the lubricant, θ is a contact angle (radians) of the lubricant, D1 is an outside diameter (m) of the vapor-liquid interface located near the opened end of the bearing seal portion, and r1 is a lubricant film thickness (m) at the vapor-liquid interface located near the opened end of the bearing seal portion.

2. A spindle motor in which the hydrodynamic bearing device according to claim 1 is installed.

3. A hydrodynamic bearing device, comprising:

a shaft;

a sleeve member that has a bearing hole including an open end and a closed end, and that is disposed in a state in which the shaft is inserted in the bearing hole with a microscopic gap in between, and in which the sleeve member is capable of rotation relative to the shaft;

a lubricant that fills the microscopic gap;

a bearing portion that has a radial bearing portion supporting the shaft and the sleeve member in a radial direction of the shaft via the lubricant, and a thrust bearing portion supporting the shaft and the sleeve member in an axial direction; and a bearing seal portion that is disposed on an opened end side of the bearing portion, and suppresses leakage of the lubricant from the opened end by capillary force working between the shaft and the sleeve member, wherein the bearing seal portion is formed by an outer peripheral surface of the shaft and an inner peripheral surface of the sleeve member, and a value of a function P1/V1, where V1 implies a fluctuation volume and P1 is a first capillary pressure index, is at least $1.5 \times 10^{12}$ (Pa/m$^3$), wherein $V1 = \pi \times dg \times dg \times G$, in which V1 is a volume (m$^3$) by which the sleeve member is able to move in the axial direction relative to the shaft, dg is an outermost radius (m) of the bearing portion at the open end, and G is a distance (m) by which the sleeve member is able to move in the axial direction relative to the shaft, $Fg1o = \pi \times D1 \times \gamma \times \cos\theta$, $Fg1i = \pi \times D1i \times \gamma \times \cos\theta$, $D1i = D1 - 2 \times r1$, $Fg1 = Fg1o + Fg1i$, $Ag1 = \pi \times (D1^2 - D1i^2)/4$, and $P1 = Fg1/Ag1$, in which P1 is a capillary pressure index (Pa) at a vapor-liquid interface located near the opened end of the bearing seal portion, γ is a surface tension (N/m) of the lubricant, θ is a contact angle (radians) of the lubricant, D1 is an outside diameter (m) of the vapor-liquid interface located near the opened end of the bearing seal portion, and r1 is a lubricant film thickness (m) at the vapor-liquid interface located near the opened end of the bearing seal portion.

4. A spindle motor in which the hydrodynamic bearing device according to claim 3 is installed.

5. A hydrodynamic bearing device, comprising:

a shaft;

a sleeve member that has a bearing hole including an open end and a closed end, and that is disposed in a state in which the shaft is inserted in the bearing hole with a microscopic gap in between, and in which the sleeve member is capable of rotation relative to the shaft;

a lubricant that fills the microscopic gap;

a bearing portion that has a radial bearing portion supporting the shaft and the sleeve member in a radial direction of the shaft via the lubricant, and a thrust bearing portion supporting the shaft and the sleeve member in an axial direction; and a bearing seal portion that is disposed on an opened end side of the bearing portion, and suppresses leakage of the lubricant from the opened end by capillary force working between the shaft and the sleeve member, wherein a value of a function (P1/V1)×D1×D1×L, where V1 implies a fluctuation volume, P1 is a first capillary pressure index, D1 is an outside diameter of a vapor-liquid interface located near the opened end of the bearing seal portion, and L is a bearing length, which is a length in the axial direction of a portion filled with the lubricant, is at least 45,000 (Pa), wherein $V1 = \pi \times dg \times dg \times G$, in which V1 is a volume (m$^3$) by which the sleeve member is able to move in the axial direction relative to the shaft, dg is an outermost radius (m) of the bearing portion at the open end, and G is a distance (m) by which the sleeve member is able to move in the axial direction relative to the shaft, $Fg1o = \pi \times D1 \times \gamma \times \cos\theta$, $Fg1i = \pi \times D1i \times \gamma \times \cos\theta$, $D1i = D1 - 2 \times r1$, $Fg1 = Fg1o + Fg1i$, $Ag1 = \pi \times (D1^2 - D1i^2)/4$, and $P1 = Fg1/Ag1$, in which P1 is a capillary pressure index (Pa) at the vapor-liquid interface located near the opened end of the bearing seal portion, γ is a surface tension (N/m) of the lubricant, θ is a contact angle (radians) of the lubricant, D1 is the outside diameter (m) of the vapor-liquid interface located near the opened end of the bearing seal portion, r1 is a lubricant film thickness (m) at the vapor-liquid interface located near the opened end of the bearing seal portion, and L is the bearing length (m) which is the length in the axial direction of the portion filled with the lubricant.

6. A spindle motor in which the hydrodynamic bearing device according to claim 5 is installed.

7. A hydrodynamic bearing device, comprising:
a shaft;
a sleeve member that has a bearing hole including an open end and a closed end, and that is disposed in a state in which the shaft is inserted in the bearing hole with a microscopic gap in between, and in which the sleeve member is capable of rotation relative to the shaft;
a lubricant that fills the microscopic gap;
a bearing portion that has a radial bearing portion supporting the shaft and the sleeve member in a radial direction of the shaft via the lubricant, and a thrust bearing portion supporting the shaft and the sleeve member in an axial direction; and
a bearing seal portion that is disposed on an opened end side of the bearing portion, and suppresses leakage of the lubricant from the opened end by capillary force working between the shaft and the sleeve member,
wherein a value of a function $(P1/V1) \times D1 \times D1 \times r3 \times L$, where V1 implies a fluctuation volume, P1 is a first capillary pressure index, D1 is an outside diameter of a vapor-liquid interface located near the opened end of the bearing seal portion, L is a bearing length, which is a length in the axial direction of a portion filled with the lubricant, and r3 is a gap of the radial bearing portion in the radial direction of the shaft, is at least 0.1 (Pa·m), wherein $V1 = \pi \times dg \times dg \times G$, in which V1 is a volume (m³) by which the sleeve member is able to move in the axial direction relative to the shaft,
dg is an outermost radius (m) of the bearing portion at the open end, and
G is a distance (m) by which the sleeve member is able to move in the axial direction relative to the shaft, $Fg1o = \pi \times D1 \times \gamma \times \cos\theta$, $Fg1i = \pi \times D1i \times \gamma \times \cos\theta$, $D1i = D1 - 2 \times r1$, $Fg1 = Fg1o + Fg1i$, $Ag1 = \pi \times (D1^2 - D1i^2)/4$, and $P1 = Fg1/Ag1$, in which P1 is a capillary pressure index (Pa) at the vapor-liquid interface located near the opened end of the bearing seal portion,
γ is a surface tension (N/m) of the lubricant,
θ is a contact angle (radians) of the lubricant,
D1 is the outside diameter (m) of the vapor-liquid interface located near the opened end of the bearing seal portion,
r1 is a lubricant film thickness (m) at the vapor-liquid interface located near the opened end of the bearing seal portion,
L is the bearing length (m) which is the length in the axial direction of the portion filled with the lubricant, and
r3 is the gap (m) of the radial bearing portion in the radial direction of the shaft.

8. A spindle motor in which the hydrodynamic bearing device according to claim 7 is installed.

9. A hydrodynamic bearing device, comprising:
a shaft;
a sleeve member that has a bearing hole including an open end and a closed end, and that is disposed in a state in which the shaft is inserted in the bearing hole with a microscopic gap in between, and in which the sleeve member is capable of rotation relative to the shaft;
a lubricant that fills the microscopic gap;
a bearing portion that has a radial bearing portion supporting the shaft and the sleeve member in a radial direction of the shaft via the lubricant, and a thrust bearing portion supporting the shaft and the sleeve member in an axial direction; and
a bearing seal portion that is disposed on an opened end side of the bearing portion, and suppresses leakage of the lubricant from the opened end by capillary force working between the shaft and the sleeve member,
wherein a rotor hub member formed from a substantially circular top plate and a cylindrical wall hanging down from the top plate is attached on an open end side of the shaft,
the bearing seal portion is formed by an outer peripheral surface of the sleeve member and an inner peripheral surface of the rotor hub member, and
a value of a function P2/V1, where V1 is a fluctuation volume and P2 is a capillary pressure index, is at least $1.0 \times 10^{12}$ (Pa/m³), wherein $V1 = \pi \times dg \times dg \times G$, in which V1 is a volume (m³) by which the sleeve member is able to move in the axial direction relative to the shaft,
dg is an outermost radius (m) of the bearing portion at the open end, and
G is a distance (m) by which the sleeve member is able to move in the axial direction relative to the shaft, $Fg2o = \pi \times D2 \times \gamma \times \cos\theta$, $Fg2i = \pi \times D2i \times \gamma \times \cos\theta$, $D2i = D2 - 2 \times r2$, $Fg2 = Fg2o + Fg2i$, $Ag2 = \pi \times (D2^2 - D2i^2)/4$, and $P2 = Fg2/Ag2$, in which P2 is a capillary pressure index (Pa) at a vapor-liquid interface located near an interior part of the bearing seal portion,
γ is a surface tension (N/m) of the lubricant,
θ is a contact angle (radians) of the lubricant,
D2 is an outside diameter (m) of the interior part of the bearing seal portion, and
r2 is a lubricant film thickness (m) at the vapor-liquid interface located near the interior part of the bearing seal portion.

10. A spindle motor in which the hydrodynamic bearing device according to claim 9 is installed.

11. A hydrodynamic bearing device, comprising:
a shaft;
a sleeve member that has a bearing hole including an open end and a closed end, and that is disposed in a state in which the shaft is inserted in the bearing hole with a microscopic gap in between, and in which the sleeve member is capable of rotation relative to the shaft;
a lubricant that fills the microscopic gap;

a bearing portion that has a radial bearing portion supporting the shaft and the sleeve member in a radial direction of the shaft via the lubricant, and a thrust bearing portion supporting the shaft and the sleeve member in an axial direction; and a bearing seal portion that is disposed on an opened end side of the bearing portion, and suppresses leakage of the lubricant from the opened end by capillary force working between the shaft and the sleeve member, wherein the bearing seal portion is formed by an outer peripheral surface of the shaft and an inner peripheral surface of the sleeve member, and a value of a function P2/V1, where V1 is a fluctuation volume and P2 is a capillary pressure index, is at least $6.0 \times 10^{12}$ (Pa/m$^3$), wherein $V1 = \pi \times dg \times dg \times G$, in which V1 is a volume (m$^3$) by which the sleeve member is able to move in the axial direction relative to the shaft, dg is an outermost radius (m) of the bearing portion at the open end, and G is a distance (m) by which the sleeve member is able to move in the axial direction relative to the shaft, $Fg2o = \pi \times D2 \times \gamma \times \cos\theta$, $Fg2i = \pi \times D2i \times \gamma \times \cos\theta$, $D2i = D2 - 2 \times r2$, $Fg2 = Fg2o + Fg2i$, $Ag2 = \pi \times (D2^2 - D2i^2)/4$, and $P2 = Fg2/Ag2$, in which P2 is a capillary pressure index (Pa) at a vapor-liquid interface located near an interior part of the bearing seal portion, γ is a surface tension (N/m) of the lubricant, θ is a contact angle (radians) of the lubricant, D2 is an outside diameter (m) of the interior part of the bearing seal portion, and r2 is a lubricant film thickness (m) at the vapor-liquid interface located near the interior part of the bearing seal portion.

12. A spindle motor in which the hydrodynamic bearing device according to claim 11 is installed.

* * * * *